United States Patent
Kanou et al.

(10) Patent No.: US 10,833,505 B2
(45) Date of Patent: Nov. 10, 2020

(54) POWER CONTROLLER APPARATUS FOR POWER SYSTEM INCLUDING MULTIPLE CUSTOMER FACILITIES WITH BATTERY APPARATUS

(71) Applicant: Panasonic Intellectual Property Management Co., Ltd., Osaka (JP)

(72) Inventors: Junichi Kanou, Osaka (JP); Akira Minegishi, Osaka (JP); Noriaki Takeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/493,596

(22) PCT Filed: Mar. 8, 2018

(86) PCT No.: PCT/JP2018/008998
§ 371 (c)(1),
(2) Date: Sep. 12, 2019

(87) PCT Pub. No.: WO2018/168646
PCT Pub. Date: Sep. 20, 2018

(65) Prior Publication Data
US 2020/0083711 A1    Mar. 12, 2020

(30) Foreign Application Priority Data
Mar. 13, 2017    (JP) .................................. 2017-047714

(51) Int. Cl.
*H02J 3/32*    (2006.01)
*H02J 3/14*    (2006.01)
(Continued)

(52) U.S. Cl.
CPC .................. *H02J 3/32* (2013.01); *H02J 3/14* (2013.01); *H02J 3/38* (2013.01); *H02J 3/003* (2020.01); *H02J 2310/14* (2020.01)

(58) Field of Classification Search
CPC ........ H02J 3/00; H02J 3/32; H02J 3/14; H02J 3/38; H02J 3/003; H02J 310/14
See application file for complete search history.

(56) References Cited

U.S. PATENT DOCUMENTS

2013/0079937 A1    3/2013    Aisu
2015/0165931 A1    6/2015    Hanashima et al.
(Continued)

FOREIGN PATENT DOCUMENTS

JP    2013-74636 A    4/2013
JP    5467010 B2    4/2014
(Continued)

OTHER PUBLICATIONS

International Search Report issued in corresponding International Patent Application No. PCT/JP2018/008998, dated Apr. 10, 2018, with English translation.
(Continued)

*Primary Examiner* — Robert L Deberadinis
(74) *Attorney, Agent, or Firm* — McDermott Will & Emery LLP

(57) ABSTRACT

A power controller apparatus predicts demand power of a load apparatus, generated power of a power generator apparatus, and inherent stored energy of a battery apparatus. The power controller apparatus calculates excess electric energy and deficient electric energy achieved when the inherent stored energy reaches higher- and lower-limit stored energies, respectively. The power controller apparatus combines at least one first customer facility and at least one second customer facility having the excess electric energy and the
(Continued)

deficient electric energy, respectively, and thus, forms at least one group including the first and second customer facilities. For each group, the power controller apparatus determines transmitting power from the first customer facility to the second customer facility, so that stored energy of each of the battery apparatuses of the first and second customer facilities is equal to or less than a first threshold, and equal to or more than a second threshold.

21 Claims, 18 Drawing Sheets

(51) Int. Cl.
*H02J 3/38* (2006.01)
*H02J 3/00* (2006.01)

(56) References Cited

U.S. PATENT DOCUMENTS

| | | |
|---|---|---|
| 2015/0213564 A1 | 7/2015 | Ishida et al. |
| 2017/0012467 A1 | 1/2017 | Satoh et al. |

FOREIGN PATENT DOCUMENTS

| | | |
|---|---|---|
| JP | 5909555 B2 | 4/2016 |
| WO | 2014/068815 A1 | 5/2014 |
| WO | 2015/121937 A1 | 8/2015 |

OTHER PUBLICATIONS

English translation of the International Preliminary Report on Patentability issued in International Patent Application No. PCT/JP2018/008998, dated Sep. 17, 2019.

Fig.9

|     | EXCESS AND DEFICIENT ELECTRIC ENERGIES IN UNIT TIME INTERVAL ||
|     | EXCESS ELECTRIC ENERGY | DEFICIENT ELECTRIC ENERGY |
| --- | --- | --- |
| A-1 | 3 kWh | 0 kWh |
| B-1 | 0 kWh | 3 kWh |
| A-2 | 20 kWh | 0 kWh |
| B-2 | 0 kWh | 20 kWh |
| C-1 | 10 kWh | 10 kWh |
| A-3 | 10 kWh | 0 kWh |
| B-3 | 0 kWh | 10 kWh |
| D-1 | 0 kWh | 0 kWh |

Fig.11

|     | EXCESS AND DEFICIENT ELECTRIC ENERGIES IN UNIT TIME INTERVAL ||  TIME OF OCCURRENCE | LOCATION OF CUSTOMER FACILITY 1 |
|-----|------------------------|---------------------------|---------|---------|
|     | EXCESS ELECTRIC ENERGY | DEFICIENT ELECTRIC ENERGY |         |         |
| A-1 | 3 kWh                  | 0 kWh                     | 10:00   | POINT a |
| B-1 | 0 kWh                  | 3 kWh                     | 10:00   | POINT a |
| A-2 | 3 kWh                  | 0 kWh                     | 15:00   | POINT a |
| B-2 | 0 kWh                  | 3 kWh                     | 15:00   | POINT a |
| A-3 | 3 kWh                  | 0 kWh                     | 15:00   | POINT b |
| B-3 | 0 kWh                  | 3 kWh                     | 15:00   | POINT b |

POWER CONTROLLER APPARATUS FOR POWER SYSTEM INCLUDING MULTIPLE CUSTOMER FACILITIES WITH BATTERY APPARATUS

CROSS-REFERENCE OF RELATED APPLICATIONS

This application is the U.S. National Phase under 35 U.S.C. § 371 of International Patent Application No. PCT/JP2018/008998, filed on Mar. 8, 2018, which in turn claims the benefit of Japanese Application No. 2017-047714, filed on Mar. 13, 2017, the entire disclosures of which Applications are incorporated by reference herein.

TECHNICAL FIELD

The present disclosure relates to a power controller apparatus for a power system including a plurality of customer facilities each provided with a battery apparatus. The present disclosure also relates to a power system including such a power controller apparatus and customer facilities.

BACKGROUND ART

Some customers of commercial power (electric power) use a customer facility provided with a battery apparatus and/or a power generator apparatus, as well as various load apparatuses consuming power. By using the battery apparatus, it is possible to reduce a peak of power consumed by the load apparatuses of the customer facility. In addition, by using the power generator apparatus, it is possible to reduce power consumption and price of the commercial power.

In Japan, the Feed-in Tariff (FIT) Scheme for Renewable Energy is planned to end in 2019. Accordingly, in order for a load apparatus of a customer facility to efficiently consume power generated by a power generator apparatus of the same customer facility, it is expected that there will be an increased demand for battery apparatuses.

The larger the capacity of the battery apparatus increases, the higher the price is. If a too large-capacity and too expensive battery apparatus is used, then it is difficult to recover initial investment costs. On the other hand, if a small-capacity battery apparatus is used in order to reduce costs, then its stored energy readily reaches an upper limit or a lower limit, resulting in waste of generated power, or failure to supply power to a load apparatus in an emergency, such as power interruption.

Therefore, it has been proposed to transmit and receive power among a plurality of customer facilities of a power system, the plurality of customer facilities each provided with a battery apparatus. For example, see Patent Document 1.

CITATION LIST

Patent Documents

PATENT DOCUMENT 1: PCT International Publication WO 2015/121937 A1

SUMMARY OF INVENTION

Technical Problem

When using a small-capacity battery apparatus, a state of charge largely varies by charging and discharging, and therefore, the battery apparatus readily degrades. In order to prevent the battery apparatus from degrading and reduce an increase in maintenance costs, and the like, it is required to reduce variations of the stored energy.

In addition, when transmitting and receiving power among a plurality of customer facilities, a very high computational burden occurs by calculating and optimizing some characteristic indicator for all combinations of customer facilities. Therefore, it is required to determine combinations of customer facilities between which power is transmitted, with a low computational burden.

An object of the present disclosure is to provide a power controller apparatus capable of controlling transmitting and receiving power among a plurality of customer facilities using small-capacity battery apparatuses, so as to efficiently and stably supply power to load apparatuses, and so as to prevent the battery apparatuses from degrading, with a low computational burden.

An object of the present disclosure is also to provide a power system including such a power controller apparatus and customer facilities.

Solution to Problem

According to an aspect of the present disclosure, a power controller apparatus is provided for a power system including a plurality of customer facilities connected with each other via a power network. Each of the customer facilities is provided with a load apparatus, at least one of the customer facilities is further provided with a power generator apparatus, and at least two of the customer facilities are further provided with battery apparatuses. The power controller apparatus is provided with a predictor, an excess and deficient electric energy calculator, a group former, and a power transmitting and receiving controller. The predictor predicts demand power of the load apparatus of each of the customer facilities in a unit time interval. For each of the customer facilities provided with the power generator apparatus, the predictor predicts generated power of the power generator apparatus of each of the customer facilities in the unit time interval. For each of the customer facilities provided with the battery apparatus, the predictor predicts inherent stored energy indicating stored energy of the battery apparatus of each of the customer facilities in the unit time interval, the inherent stored energy achieved when power is not transmitted to nor received from other customer facilities. For each of the customer facilities provided with the power generator apparatus and the battery apparatus, the excess and deficient electric energy calculator calculates excess electric energy generated by the power generator apparatus and not consumed by the load apparatus when the inherent stored energy reaches a first threshold, in the unit time interval, based on the demand power, the generated power, and the inherent stored energy. For each of the customer facilities provided with the battery apparatus, the excess and deficient electric energy calculator calculates deficient electric energy having to be supplied from other customer facilities when the inherent stored energy reaches a second threshold smaller than the first threshold, in the unit time interval, based on the demand power and the inherent stored energy, or based on the demand power, the generated power, and the inherent stored energy. The group former combines at least one first customer facility and at least one second customer facility among the customer facilities provided with the battery apparatuses, the first customer facility having the excess electric energy in the unit time interval, and the second customer facility having the deficient electric energy in the unit time interval, whereby forming at least one group including the first and second customer facilities. For each group including the first and second customer facilities, the power transmitting and receiving controller determines transmitting power from the first customer facility to the second customer facility, so that stored energy of each of the battery apparatuses of the first and second customer facilities is equal to or less than the first threshold, and equal to or more than the second threshold, over the unit time interval.

Advantageous Effects of Invention

According to the power controller apparatus of the present disclosure, it is possible to control transmitting and receiving power among a plurality of customer facilities using small-capacity battery apparatuses, so as to efficiently and stably supply power to load apparatuses, and so as to prevent the battery apparatuses from degrading, with a low computational burden.

BRIEF DESCRIPTION OF DRAWINGS

FIG. 9 is a table showing exemplary groups formed by performing the grouping process of FIG. 8.

FIG. 11 is a table showing exemplary groups formed by performing a grouping process of FIG. 10.

DESCRIPTION OF EMBODIMENTS

Hereinafter, embodiments of the present disclosure will be described with reference to the drawings.

First Embodiment

Figure 1:
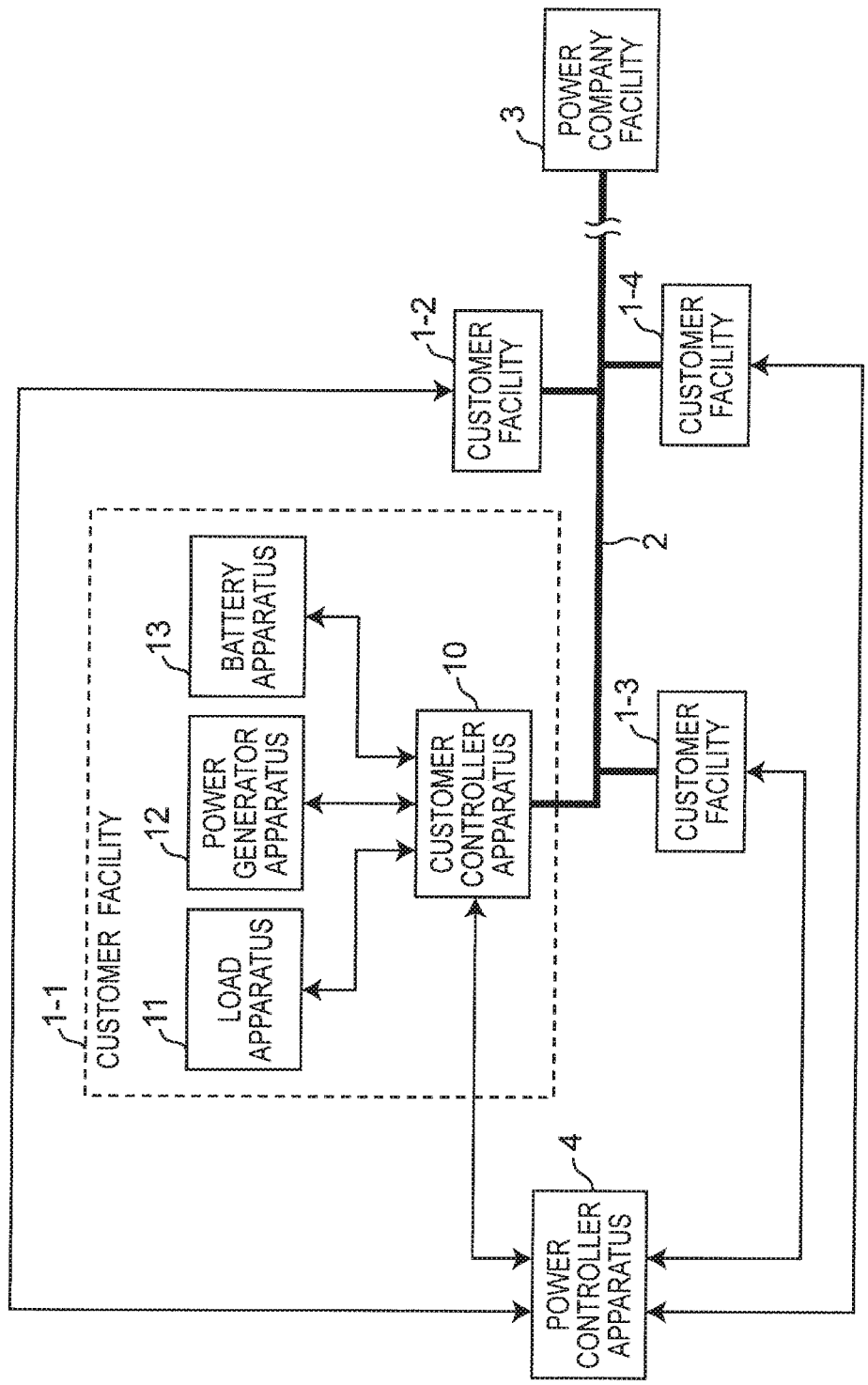
FIG. 1 is a block diagram showing a configuration of a power system according to a first embodiment.

FIG. 1 is a block diagram showing a configuration of a power system according to a first embodiment. The power system of FIG. 1 includes a plurality of customer facilities 1-1 to 1-4, a power network 2, a power company facility 3, and a power controller apparatus 4.

The plurality of customer facilities 1-1 to 1-4 is connected to each other via the power network 2, and is further connected to the power company facility 3 via the power network 2.

The power company facility 3 includes a power plant, a power substation, a power transmission network, a distribution network, etc. of a power company (such as power operator, system operator), and supplies commercial power to the customer facilities 1-1 to 1-4 via the power network 2. Target power of peak reduction may be set for the commercial power by a contract between a customer and a power company.

The customer facility 1-1 is provided with a customer controller apparatus 10, a load apparatus 11, a power generator apparatus 12, and a battery apparatus 13. The customer facility 1-1 is a house, a store, a factory, or the like, equipped with these components.

The load apparatus 11 includes various electrical appliances, and has demand power consumed by these electrical appliances.

The power generator apparatus 12 generates generated power by, for example, renewable energy, such as a solar cell.

The battery apparatus 13 stores the generated power generated by the power generator apparatus 12, or the commercial power supplied from the power company facility 3.

The customer controller apparatus 10 monitors the demand power of the load apparatus 11, the generated power of the power generator apparatus 12, and stored energy of the battery apparatus 13, and notifies the power controller apparatus 4 of the monitored results. For example, the customer controller apparatus 10 may be integrated into a distribution board or the like, or may be electrically connected to the distribution board or the like.

The other customer facilities 1-2 to 1-4 are also configured in a manner similar to that of the customer facility 1-1. In the present specification, the customer facilities 1-1 to 1-4 are also collectively referred to as "customer facilities 1".

The customer facilities 1 transmit and receive power to and from each other. In order to simultaneously transmit power among a plurality of sets of customer facilities 1 via a common power line, the customer facilities 1 may modulate and transmit power by code modulation using modulation codes orthogonal to each other.

The power controller apparatus 4 controls transmitting and receiving power among the customer facilities 1-1 to 1-4.

Figure 2:
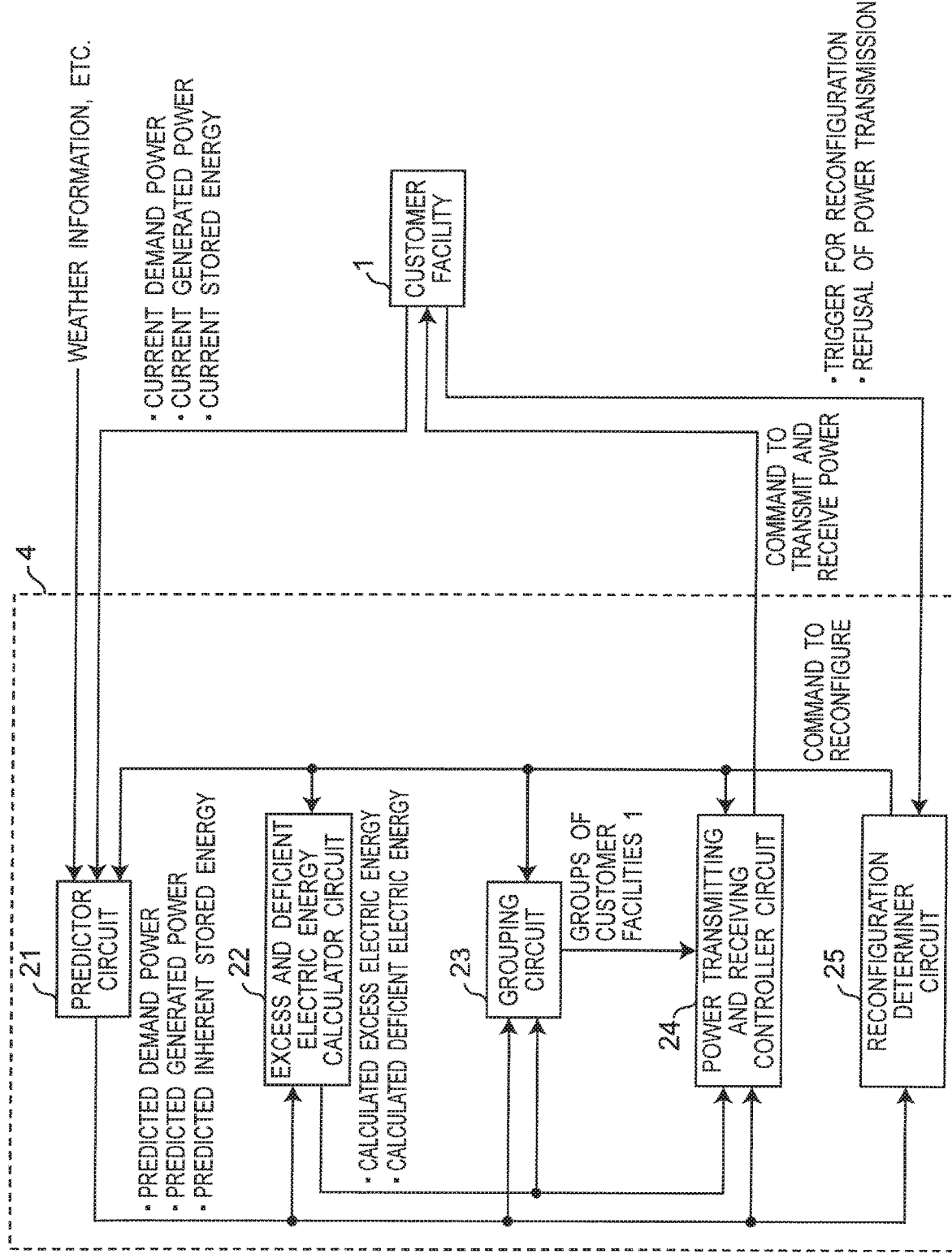
FIG. 2 is a block diagram showing a configuration of a power controller apparatus 4 of FIG. 1.

FIG. 2 is a block diagram showing a configuration of the power controller apparatus 4 of FIG. 1. The power controller apparatus 4 is provided with a predictor circuit 21, an excess and deficient electric energy calculator circuit 22, a grouping circuit 23, a power transmitting and receiving controller circuit 24, and a reconfiguration determiner circuit 25.

The predictor circuit 21 receives information on current demand power, current generated power, and current stored energy, from each customer facility 1. The predictor circuit 21 further receives additional information, such as weather information, from a third-party server apparatus or the like. The predictor circuit 21 predicts demand power of the load apparatus 11 of the customer facility 1-1 in a time interval of a predetermined length from current time to future time (in the present specification, referred to as a "unit time interval"), based on the information received from the customer facility 1-1. The length of the unit time interval may be, for example, several hours, 24 hours, or several days. The predictor circuit 21 may receive a history of power usage and the like, from the customer facility 1-1, in order to predict the demand power of the customer facility 1-1. The predictor circuit 21 also predicts generated power of the power generator apparatus 12 of the customer facility 1-1 in the unit time interval, based on the information received from the customer facility 1-1, and based on the weather information. The predictor circuit 21 also predicts inherent stored energy based on the information received from the customer facility 1-1, the inherent stored energy indicating stored energy of the battery apparatus 13 of the customer facility 1-1 in the unit time interval, the inherent stored energy achieved when power is not transmitted to and received from the other customer facilities 1-2 to 1-4. Similarly, the predictor circuit 21 predicts demand power, generated power, and inherent stored energy of each of the customer facilities 1-2 to 1-4, based on the information received from the customer facilities 1-2 to 1-4.

For each of the customer facilities 1, the excess and deficient electric energy calculator circuit 22 calculates excess electric energy generated by the power generator apparatus 12 and not consumed by the load apparatus 11 when the inherent stored energy reaches a first threshold, in the unit time interval, based on the predicted demand power, the predicted generated power, and the predicted inherent stored energy. For each of the customer facilities 1, the excess and deficient electric energy calculator circuit 22 also calculates deficient electric energy having to be supplied from the other customer facility 1 when the inherent stored energy reaches a second threshold smaller than the first threshold, in the unit time interval, based on the predicted demand power, the predicted generated power, and the predicted inherent stored energy. The first and second thresholds are upper and lower limits of the stored energy, respectively, determined so that the battery apparatus 13 can operate for a long term without applying an excessive burden on the battery apparatus 13, and without significantly degrading the battery apparatus 13. The second threshold may be set to an amount of stored energy enough to supply power to the customer facilities 1 with the battery apparatuses 13, or to all the customer facilities 1 in the power system, for one to two days, in an emergency, such as power interruption, or disconnection from the power company facility 3. The first and second thresholds may be different for each battery apparatus 13. When the target power of peak reduction is set for the commercial power, the excess electric energy and the deficient electric energy may be calculated so that a part of the demand power, below the target power of peak reduction, is obtained from the commercial power. In the present specification, the first threshold is also referred to as an "upper-limit stored energy", and the second threshold is also referred to as a "lower-limit stored energy".

The grouping circuit 23 forms a group(s) of customer facilities 1, based on the predicted demand power, the predicted generated power, and the predicted inherent stored energy of each customer facility 1, and based on the calculated excess electric energy and the calculated deficient electric energy of each customer facility 1. The grouping circuit 23 combines at least one first customer facility 1 having the excess electric energy in the unit time interval, and at least one second customer facility 1 having the deficient electric energy in the unit time interval, and thus, forms at least one group including the first and second customer facilities 1.

The power transmitting and receiving controller circuit 24 determines and instructs power transmitting and receiving among the customer facilities 1, based on the predicted demand power, the predicted generated power, and the predicted inherent stored energy of each customer facility 1, based on the calculated excess electric energy and the calculated deficient electric energy of each customer facility 1, and based on the groups of the customer facilities 1. For each group including the first and second customer facilities 1, the power transmitting and receiving controller circuit 24 determines transmitting power from the first customer facility 1 to the second customer facility 1, so that stored energy of each of the battery apparatuses 13 of the first and second customer facilities 1 is equal to or less than the first threshold, and equal to or more than the second threshold, over the unit time interval. The power transmitting and receiving controller circuit 24 instructs the first and second customer facilities 1 to transmit and receive the determined transmitting power.

The reconfiguration determiner circuit 25 instructs the predictor circuit 21, the excess and deficient electric energy calculator circuit 22, the grouping circuit 23, and the power transmitting and receiving controller circuit 24 to reconfigure power transmitting and receiving among the customer facilities 1, when detecting a trigger for reconfiguration. When receiving a command to reconfigure, the predictor circuit 21, the excess and deficient electric energy calculator circuit 22, the grouping circuit 23, and the power transmitting and receiving controller circuit 24 repeat: predicting the demand power, the generated power, and the inherent stored energy; calculating the excess electric energy and the deficient electric energy; forming the at least one group; and determining the transmitting power, respectively. The trigger for reconfiguration, for example, is as follows.

The reconfiguration determiner circuit 25 may instruct the predictor circuit 21, the excess and deficient electric energy calculator circuit 22, the grouping circuit 23, and the power transmitting and receiving controller circuit 24 to reconfigure themselves for every unit time interval.

When at least one of the demand power, the generated power, and the inherent stored energy which are newly predicted by the predictor circuit 21 is different from the demand power, the generated power, and the inherent stored energy which are previously predicted by the predictor circuit 21, the reconfiguration determiner circuit 25 may instruct the excess and deficient electric energy calculator circuit 22, the grouping circuit 23, and the power transmitting and receiving controller circuit 24 to reconfigure themselves.

When at least one of actual demand power and actual generated power is different from the demand power and the generated power which are previously predicted by the predictor circuit 21, the reconfiguration determiner circuit 25 may instruct the predictor circuit 21, the excess and deficient electric energy calculator circuit 22, the grouping circuit 23, and the power transmitting and receiving controller circuit 24 to reconfigure themselves.

When detecting a failure or power interruption of the customer facilities 1 or the power network 2, the reconfiguration determiner circuit 25 may instruct the predictor circuit 21, the excess and deficient electric energy calculator circuit 22, the grouping circuit 23, and the power transmitting and receiving controller circuit 24 to reconfigure themselves.

When the customer controller apparatus 10 of each of the customer facilities 1 is instructed by the power controller apparatus 4 to transmit power to the other customer facility 1, the customer controller apparatus 10 may determine whether or not predetermined conditions for transmitting power to the other customer facilities 1 are satisfied, and transmit power to the other customer facilities 1 only when the conditions are satisfied. When the conditions are not satisfied, the customer controller apparatus 10 notifies the power controller apparatus 4 of refusal of power transmission.

For example, consider a case in which a customer enrolls in a power company's demand response program. In this case, when wholesale power price rapidly increases, when demand power reaches close to supplied power, or when reliability of a power system degrades, the power company reduces or shuts down power consumption, or requests the customer to reduce or shut down power consumption, depending on price setting or incentive payment. Therefore, in this case, the customer facility 1 must reserve a part of generated power and/or a part of stored energy in order to reduce power consumption of commercial power. When the power controller apparatus 4 instructs the customer controller apparatus 10 to transmit power to other customer facilities 1 in excess of the generated power and/or the stored energy to be reserved by contract with the power company, the customer controller apparatus 10 refuses power transmission.

In addition, consider a case in which sale and purchase prices are set for power transmitting and receiving among the customer facilities 1. In this case, when a total sale price or a total purchase price exceeds a predetermined threshold, the customer controller apparatus 10 may refuse to transmit or receive power.

In addition, the customer controller apparatus 10 may refuse to transmit or receive power to or from the other customer facilities 1 according to a user's instruction.

When receiving refusal of power transmission from the customer facility 1, the reconfiguration determiner circuit 25 may also instruct the predictor circuit 21, the excess and deficient electric energy calculator circuit 22, the grouping circuit 23, and the power transmitting and receiving controller circuit 24 to reconfigure themselves.

In the present specification, the predictor circuit 21, the excess and deficient electric energy calculator circuit 22, the grouping circuit 23, the power transmitting and receiving controller circuit 24, and the reconfiguration determiner circuit 25 are referred to as a "predictor", an "excess and deficient electric energy calculator", a "group former", a "power transmitting and receiving controller", and a "reconfiguration determiner", respectively. The power controller apparatus 4 may be implemented by the hardware circuits 21 to 25, or may be implemented as a program that provides the same function as the circuits 21 to 25 when executed by a processor.

Next, with reference to FIGS. 3A to 6B, we describe power transmitting and receiving among the customer facilities 1-1 to 1-4 in FIG. 1.

Figure 3A:
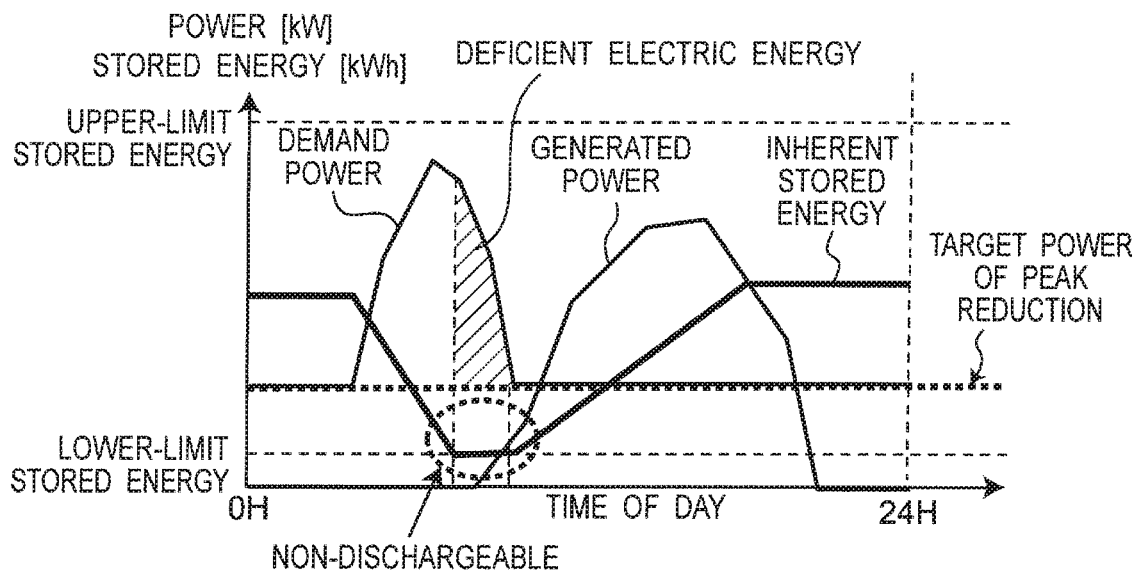
FIG. 3A is a diagram showing variations over time of demand power, generated power, and inherent stored energy of a customer facility 1 having deficient electric energy in a unit time interval.
Figure 3B:
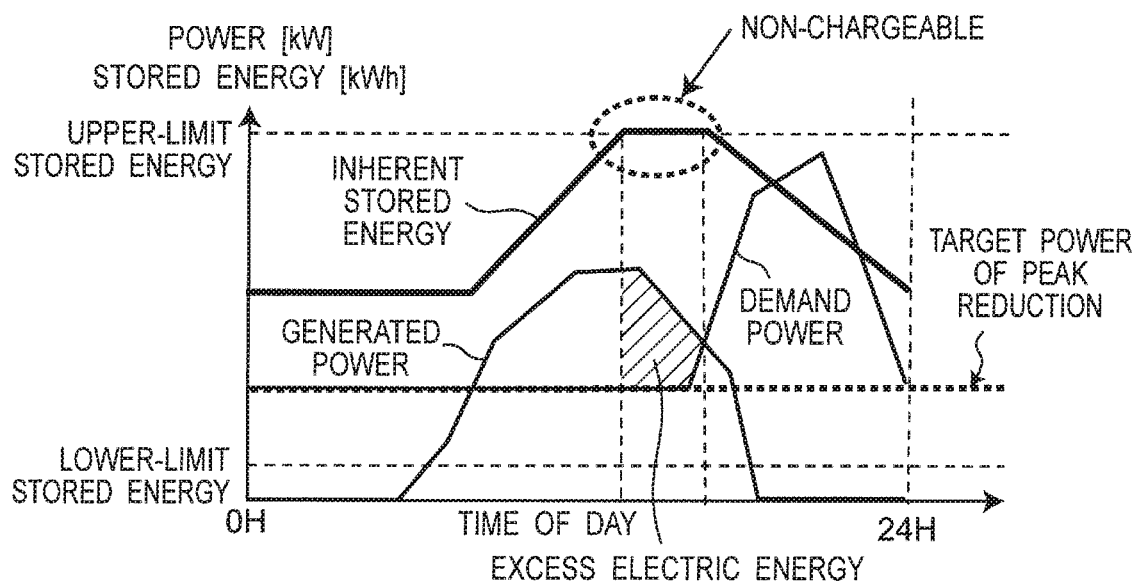
FIG. 3B is a diagram showing variations over time of demand power, generated power, and inherent stored energy of a customer facility 1 having excess electric energy in a unit time interval.

FIG. 3A is a diagram showing variations over time of demand power, generated power, and inherent stored energy of a customer facility 1 having deficient electric energy in a unit time interval. FIG. 3B is a diagram showing variations over time of demand power, generated power, and inherent stored energy of a customer facility 1 having excess electric energy in a unit time interval. In examples of FIG. 3A and other drawings, the unit time interval is 24 hours. Target power of peak reduction is set for commercial power. According to FIG. 3A, a peak of the generated power occurs around noon. In a morning hours when the generated power can not be obtained, a peak of the demand power occurs. A portion of the demand power, equal to or less than the target power of peak reduction, is obtained from the commercial power, and a portion of the demand power, exceeding the target power of peak reduction, is obtained from the battery apparatus 13. In a time interval in which the stored energy reaches the lower-limit stored energy, and the battery apparatus 13 is not dischargeable, the portion of the demand power, exceeding the target power of peak reduction, becomes deficient electric energy. In addition, according to FIG. 3B, a peak of the generated power also occurs around noon. A portion of the generated power, not exceeding the demand power, is supplied to the load apparatus 11, and a portion of the generated power, exceeding the demand power, charges the battery apparatus 13. In a time interval in which the stored energy reaches the upper-limit stored energy, and the battery apparatus 13 is not chargeable, the portion of the generated power, exceeding the demand power, becomes excess electric energy.

The customer facility 1 of FIG. 3A should receive power corresponding to the deficient electric energy, from the other customer facilities 1. On the other hand, the customer facility 1 of FIG. 3B preferably transmits power corresponding to the excess electric energy, to the other customer facilities 1, in order to avoid waste of the generated power. Therefore, the power controller apparatus 4 forms a group of customer facilities 1 by combining the customer facility 1 of FIG. 3A and the customer facility 1 of FIG. 3B.

Figure 4:
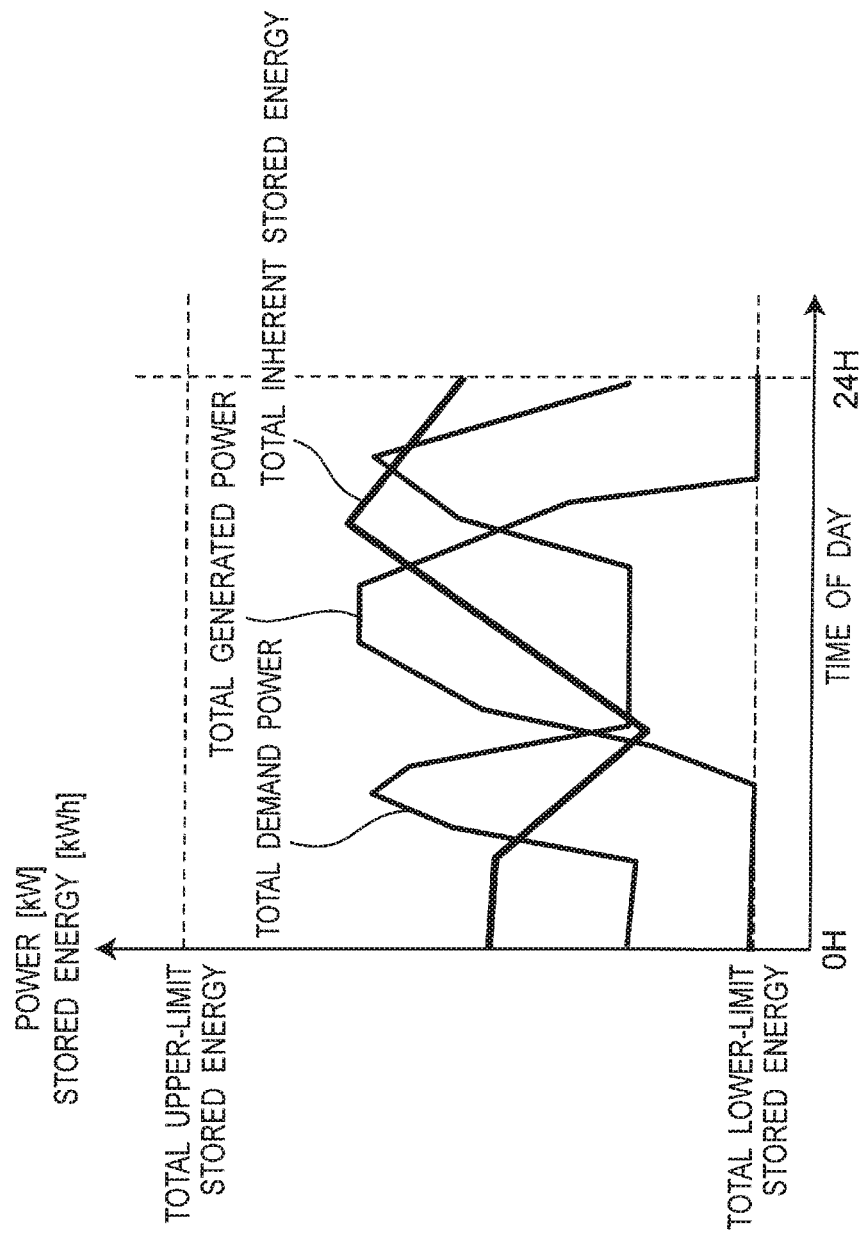
FIG. 4 is a diagram showing variations over time of total demand power, total generated power, and total inherent stored energy of the customer facility 1 of FIG. 3A and the customer facility 1 of FIG. 3B.

FIG. 4 is a diagram showing variations over time of total demand power, total generated power, and total inherent stored energy of the customer facility 1 of FIG. 3A and the customer facility 1 of FIG. 3B. According to FIG. 4, it can be seen that the total inherent stored energy of the customer facility 1 of FIG. 3A and the customer facility 1 of FIG. 3B does not reach total upper-limit stored energy nor total lower-limit stored energy. Therefore, it is possible to reduce variations of the stored energy by averaging in advance the stored energy of the battery apparatuses 13 of the customer facility 1 of FIG. 3A and the customer facility 1 of FIG. 3B.

Figure 5A:
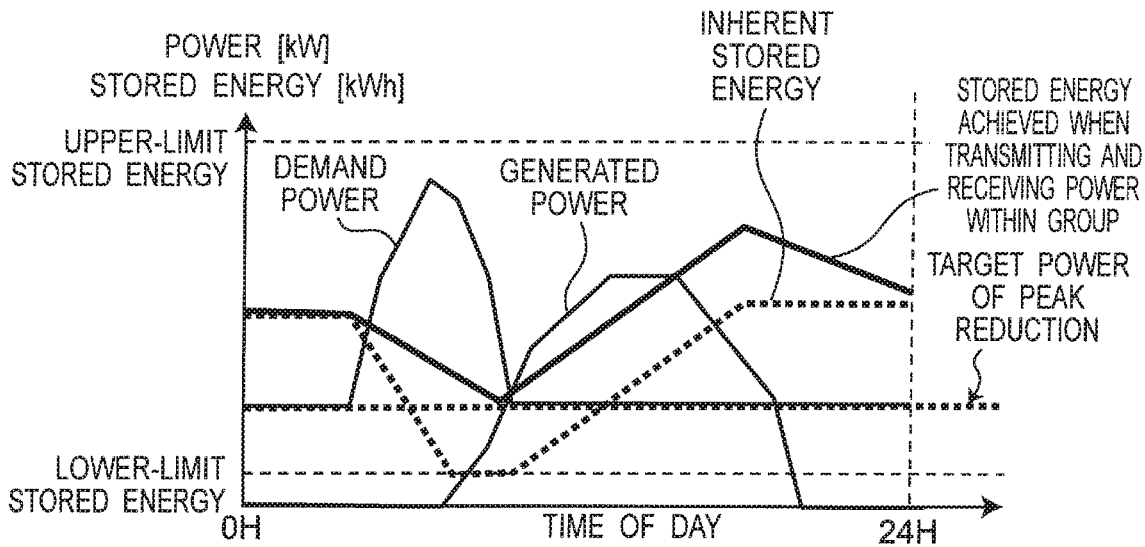
FIG. 5A is a diagram showing variations over time of demand power, generated power, and stored energy of the customer facility 1 of FIG. 3A, the stored energy achieved when transmitting and receiving power within a group.
Figure 5B:
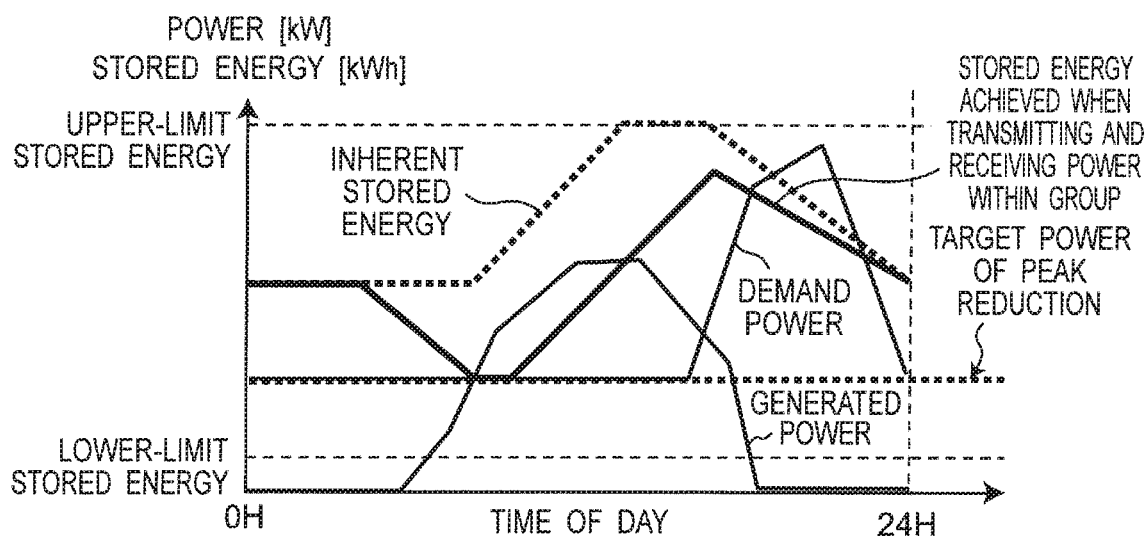
FIG. 5B is a diagram showing variations over time of demand power, generated power, and stored energy of the customer facility 1 of FIG. 3B, the stored energy achieved when transmitting and receiving power within a group.

FIG. 5A is a diagram showing variations over time of demand power, generated power, and stored energy of the customer facility 1 of FIG. 3A, the stored energy achieved when transmitting and receiving power within a group. FIG. 5B is a diagram showing variations over time of demand power, generated power, and stored energy of the customer facility 1 of FIG. 3B, the stored energy achieved when transmitting and receiving power within a group. According to FIGS. 5A and 5B, the stored energy of the battery apparatuses 13 of the customer facility 1 of FIG. 3A and the customer facility 1 of FIG. 3B is averaged in advance by transmitting and receiving power between these customer facilities 1. In both the cases of FIG. 5A and FIG. 5B, even if the battery apparatus 13 is discharged according to the demand power, the stored energy does not reach the lower-limit stored energy, and even if the battery apparatus 13 is charged according to the generated power, the stored energy does not reach the upper-limit stored energy.

Figure 6A:
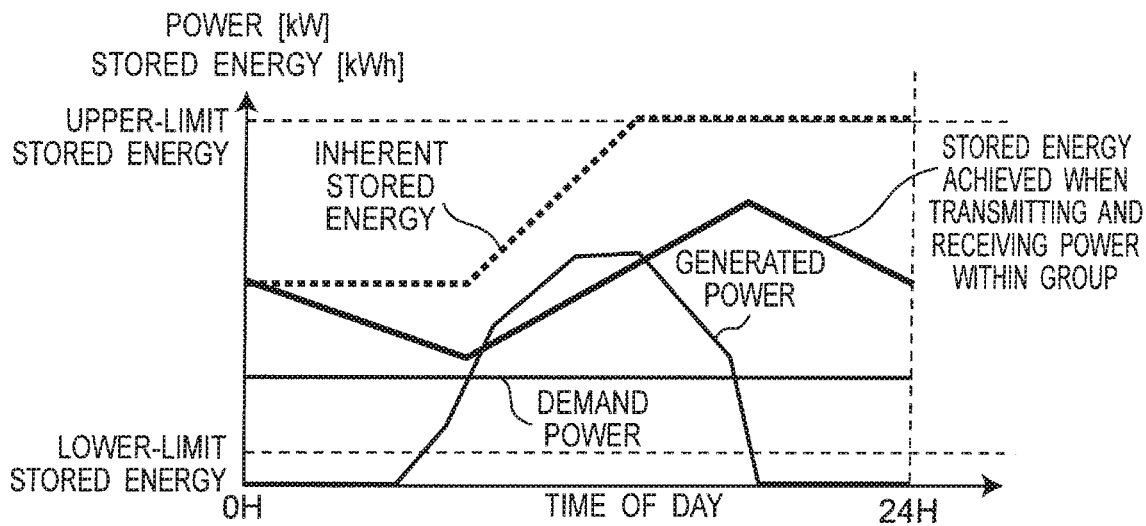
FIG. 6A is a diagram showing variations over time of demand power, generated power, and stored energy of a customer facility 1 having excess electric energy in a unit time interval, the stored energy achieved when transmitting and receiving power within a group.
Figure 6B:
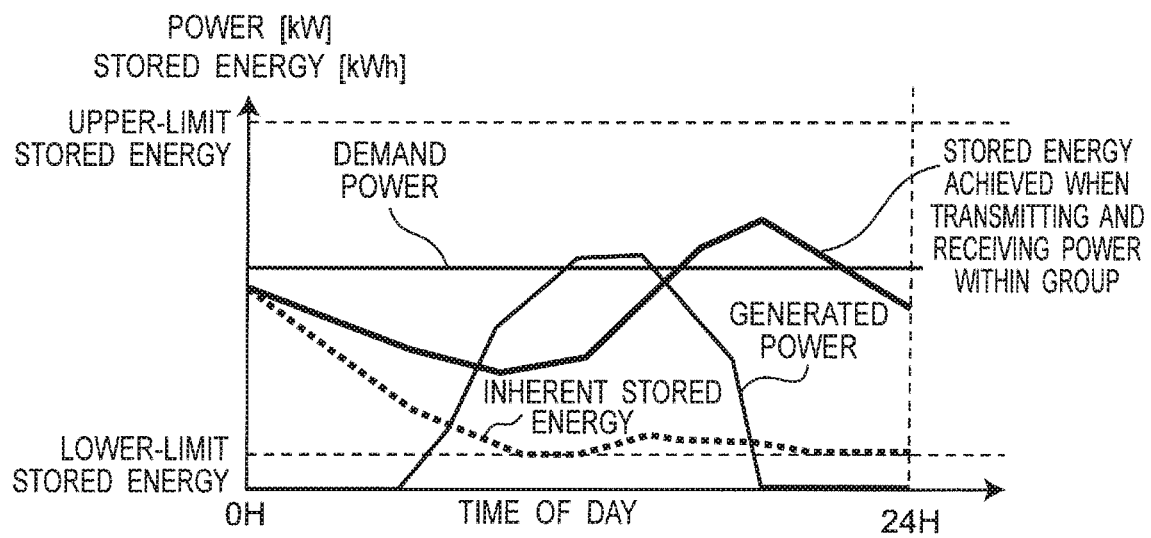
FIG. 6B is a diagram showing variations over time of demand power, generated power, and stored energy of a customer facility 1 having deficient electric energy in a unit time interval, the stored energy achieved when transmitting and receiving power within a group.

FIG. 6A is a diagram showing variations over time of demand power, generated power, and stored energy of a customer facility 1 having excess electric energy in a unit time interval, the stored energy achieved when transmitting and receiving power within a group. FIG. 6B is a diagram showing variations over time of demand power, generated power, and stored energy of a customer facility 1 having deficient electric energy in a unit time interval, the stored energy achieved when transmitting and receiving power within a group. FIGS. 6A and 6B show examples in which variations over time of the demand power are different from those of FIGS. 3A and 3B. In the case of FIG. 6A, the demand power is smaller than those of FIGS. 3A and 3B over the unit time interval. Therefore, for a longer time interval, inherent stored energy reaches the upper-limit stored energy, and the battery apparatus 13 is not chargeable. In addition, the excess electric energy also increases. In the case of FIG. 6B, the demand power is larger than those of FIGS. 3A and 3B on average over the unit time interval. Therefore, for a longer time interval, inherent stored energy reaches the lower-limit stored energy, and the battery apparatus 13 is not dischargeable. In addition, the deficient electric energy also increases. According to FIGS. 6A and 6B, the stored energy of the battery apparatuses 13 of the customer facility 1 of FIG. 6A and the customer facility 1 of FIG. 6B is averaged in advance by transmitting and receiving power between these customer facilities 1. In both FIG. 6A and FIG. 6B, even if the battery apparatus 13 is discharged according to the demand power, the stored energy does not reach the lower-limit stored energy, and even if the battery apparatus 13 is charged according to generated power, the stored energy does not reach the upper-limit stored energy.

Figure 7:
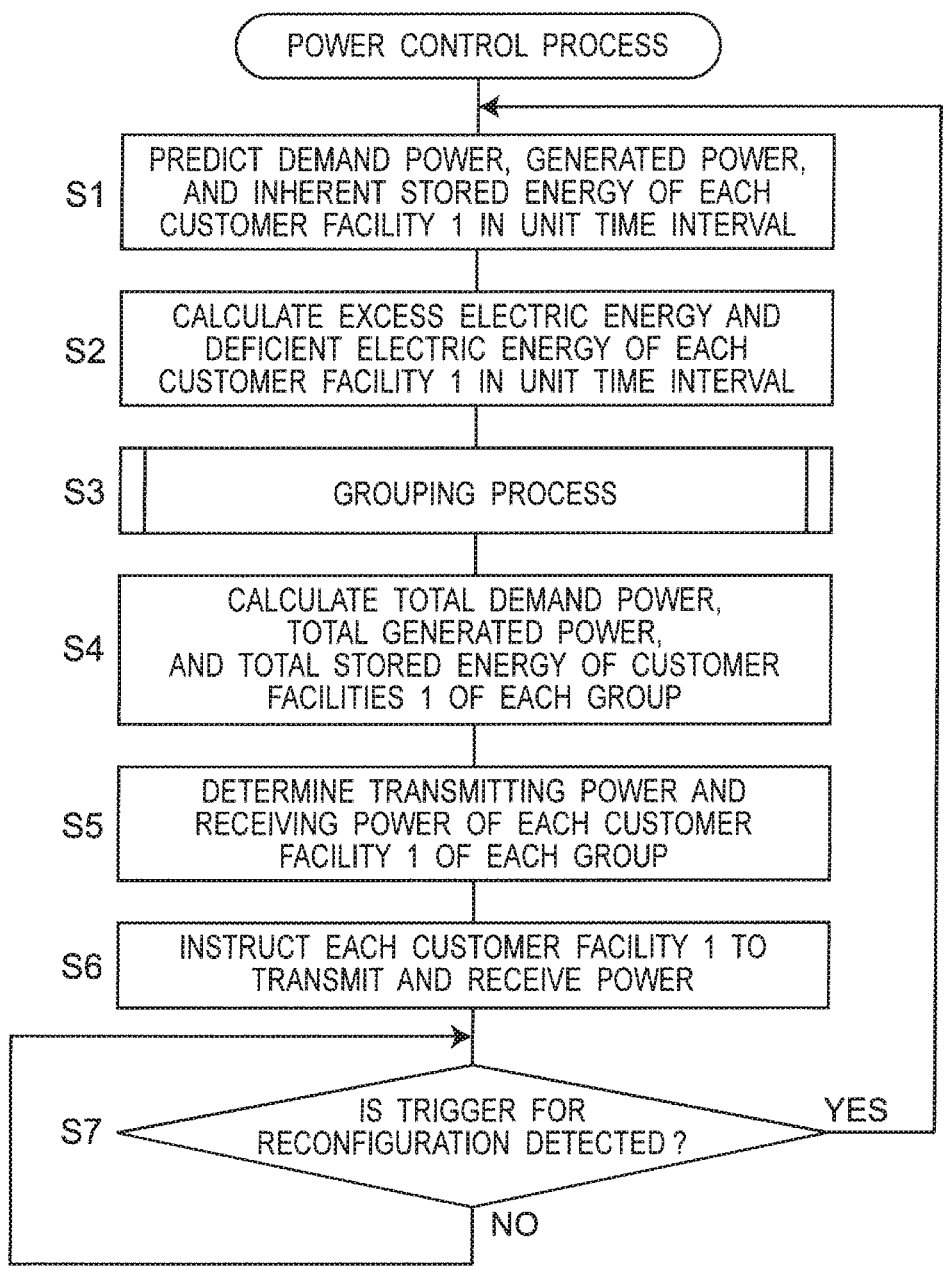
FIG. 7 is a flowchart showing a power control process performed by the power controller apparatus 4 of FIG. 1.
Figure 8:
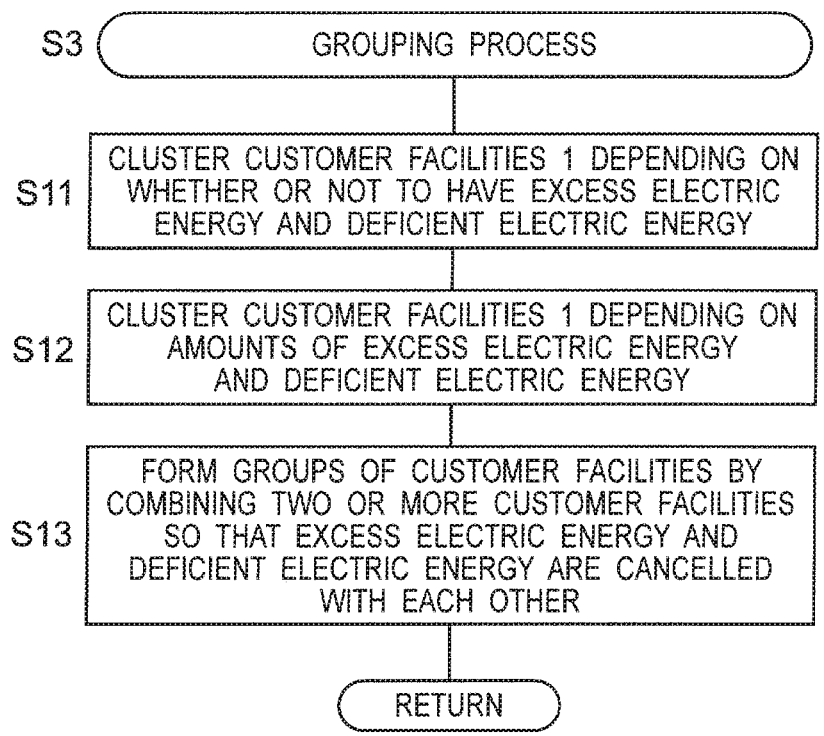
FIG. 8 is a subroutine showing a grouping process in step S3 of FIG. 7.

Next, with reference to FIGS. 7 to 9, we describe a power control process executed by the power controller apparatus 4 of FIG. 1.

FIG. 7 is a flowchart showing the power control process performed by the power controller apparatus 4 of FIG. 1. In step S1, the predictor circuit 21 of the power controller apparatus 4 predicts demand power, generated power, and inherent stored energy of each of the customer facilities 1 in a unit time interval, based on current demand power, current generated power, and current inherent stored energy of each of the customer facilities 1. In step S2, the excess and deficient electric energy calculator circuit 22 of the power controller apparatus 4 calculates excess electric energy and deficient electric energy of each of the customer facilities 1 in the unit time interval, based on the predicted demand power, the predicted generated power, and the predicted inherent stored energy. In step S3, the grouping circuit 23 of the power controller apparatus 4 executes a grouping process.

FIG. 8 is a subroutine showing the grouping process in step S3 of FIG. 7. In step S11, the grouping circuit 23 clusters (classifies) the customer facilities 1 depending on whether or not to have the excess electric energy and the deficient electric energy in the unit time interval. The customer facilities 1 are classified into the following categories A to D.

A: customer facilities 1 whose inherent stored energy reaches the upper-limit stored energy and has excess electric energy, but does not reach the lower-limit stored energy (no deficient electric energy), in the unit time interval B: customer facilities 1 whose inherent stored energy reaches the lower-limit stored energy and has deficient electric energy, but does not reach the upper-limit stored energy (no excess electric energy), in the unit time interval C: customer facilities 1 whose inherent stored energy reaches both the upper-limit stored energy and the lower-limit stored energy, and has both excess electric energy and deficient electric energy, in the unit time interval D: customer facilities 1 whose inherent stored energy reach neither the upper-limit stored energy nor the lower-limit stored energy, and has neither excess electric energy nor deficient electric energy, in the unit time interval In the present specification, the customer facilities 1 of categories A to D are also referred to as "first to fourth customer facilities", respectively.

In step S12, the grouping circuit 23 clusters the customer facilities 1 depending on amounts of the excess electric energy and the deficient electric energy.

In step S13, the grouping circuit 23 forms groups of customer facilities by combining two or more customer facilities so that the excess electric energy and the deficient electric energy are substantially cancelled with each other. The grouping circuit 23 may combine at least one customer facility 1 of category A and at least one customer facility 1 of category B, to form at least one group including the customer facilities 1 of categories A and B. In this case, the grouping circuit 23 may combine at least one customer facility 1 of category A and at least one customer facility 1 of category B having total excess electric energy and total deficient electric energy, respectively, closest to each other in the unit time interval. In addition, the grouping circuit 23 may combine at least one customer facility 1 of category A, at least one customer facility 1 of category B, and at least one customer facility 1 of category C, to form at least one group including the customer facilities 1 of categories A to C. In this case, the grouping circuit 23 may combine at least one customer facility 1 of category A and at least one customer facility 1 of category C having total excess electric energy and total deficient electric energy, respectively, closest to each other in the unit time interval, and combine at least one customer facility 1 of category B and at least one customer facility 1 of category C having total deficient electric energy and total excess electric energy, respectively, closest to each other in the unit time interval.

FIG. 9 is a table showing exemplary groups formed by performing the grouping process of FIG. 8. In the example of FIG. 9, the power system includes customer facilities 1 of category A (A-1, A-2, A-3), customer facilities 1 of category B (B-1, B-2, B-3), a customer facility 1 of category C (C-1), and a customer facility 1 of category D (D-1). Groups are formed by combining the customer facilities A-1 and B-1, combining the customer facilities A-2 and B-2, and combining the customer facilities C-1, A-3, and B-3, so that the excess electric energy and the deficient electric energy are substantially cancelled with each other. The customer facility D-1 of category D have neither excess electric energy nor deficient electric energy, so it is not necessary to group it with other customer facility 1.

In the group of the customer facilities A-1 and B-1, the excess electric energy and the deficient electric energy need not to be completely the same with each other. For example, consider a case in which the deficient electric energy of the customer facility A-1 is slightly larger than the excess electric energy of the customer facility B-1. In this case, even if the customer facility B-1 transmits electric energy larger than the excess electric energy to the customer facility A-1 so as to compensate the deficient electric energy, stored energy of the battery apparatus 13 of the customer facility B-1 would be sufficiently larger than the lower-limit stored energy. Similarly, consider a case in which the excess electric energy of the customer facility B-1 is slightly larger than the deficient electric energy of the customer facility A-1. In this case, even if the customer facility B-1 transmits electric energy larger than the deficient electric energy to the customer facility A-1 so as to consume entire excess electric energy, stored energy of the battery apparatus 13 of the customer facility A-1 would be sufficiently smaller than the upper-limit stored energy. The same also applies to the other groups, and the excess electric energy and the deficient electric energy need not to be completely the same with each other.

Although FIG. 9 shows a case in which one group includes one customer facility 1 per category, the customer facilities 1 may be combined so as to include a plurality of customer facilities 1 of the same category. For example, one group may be formed by combining two customer facilities 1 of category C, one customer facility 1 of category A, and two customer facilities 1 of category B.

When forming groups of customer facilities 1, a time or a time interval at which the excess electric energy or the deficient electric energy occurs, a distance between the customer facilities 1, and so on, may be considered, in addition to considering whether or not to have the excess electric energy and the deficient electric energy, and considering the amounts of the excess electric energy and the deficient electric energy. When transmitting and receiving power between customer facilities 1 having excess electric energy and deficient electric energy in time intervals close to each other, respectively, there is a high possibility to successfully cancel the excess electric energy and the deficient electric energy, than when transmitting and receiving power between customer facilities 1 having excess electric energy and deficient electric energy in time intervals more remote to each other, respectively. If the excess electric energy and the deficient electric energy occur in time intervals remote from each other, respectively, there is a possibility to fail to cancel the excess electric energy and the deficient electric energy due to changes in conditions, such as demand power and generated power, as described in step S7 below. In addition, the closer the distance between the customer facilities 1 transmitting and receiving power is, the smaller the loss of transmitting and receiving power is. Therefore, groups of customer facilities 1 may be formed so as to reduce the loss of transmitting and receiving power, as described below.

Figure 10:
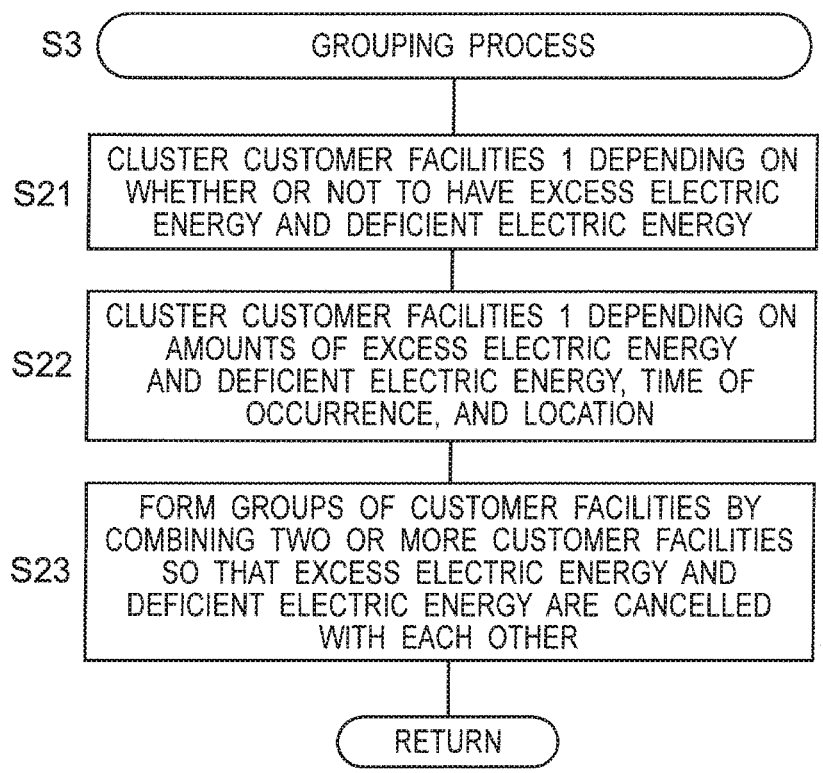
FIG. 10 is a subroutine showing a modified example of the grouping process in step S3 of FIG. 7.

FIG. 10 is a subroutine showing a modified example of the grouping process of step S3 of FIG. 7. In step S21, the grouping circuit 23 clusters the customer facilities 1 depending on whether or not to have the excess electric energy and the deficient electric energy, in a manner similar to that of step S11 of FIG. 8.

In step S22, the grouping circuit 23 clusters the customer facilities 1 depending on amounts of the excess electric energy and the deficient electric energy, time of occurrence, and location.

In step S23, the grouping circuit 23 forms groups of customer facilities by combining two or more customer facilities so that the excess electric energy and the deficient electric energy are substantially cancelled with each other.

When there are a plurality of available combinations of at least one customer facility 1 of category A and at least one customer facility 1 of category B having total excess electric energy and total deficient electric energy, respectively, closer to each other than a threshold (also referred to as a "third threshold" in the present specification) in the unit time interval, the grouping circuit 23 may form at least one group including the customer facilities 1 of categories A and B, as described below. The grouping circuit 23 may combine at least one customer facility 1 of category A and at least one customer facility 1 of category B among the available combinations of the customer facilities 1 of categories A and B, so that the customer facilities 1 of categories A and B have excess electric energy and deficient electric energy in closest sub-intervals of the unit time interval, respectively. In addition, the grouping circuit 23 may combine at least one customer facility 1 of category A and at least one customer facility 1 of category B among the available combinations of the customer facilities 1 of categories A and B, so that the customer facilities 1 of categories A and B are located at locations closest to each other.

When there are a plurality of available combinations of at least one customer facility 1 of category A and at least one customer facility of category C having total excess electric energy and total deficient electric energy, respectively, closer to each other than the third threshold in the unit time interval, and there are a plurality of available combinations of at least one customer facility 1 of category B and at least one customer facility 1 of category C having total deficient electric energy and total excess electric energy, respectively, closer to each other than the third threshold in the unit time interval, the grouping circuit 23 may form at least one group including the customer facilities 1 of categories A to C, as described below. The grouping circuit 23 may combine at least one customer facility 1 of category A and at least one customer facility of category C among the available combinations of the customer facilities 1 of categories A and C, so that the customer facilities 1 of categories A and C have excess electric energy and deficient electric energy in closest sub-intervals of the unit time interval, respectively. In addition, the grouping circuit 23 may combine at least one customer facility 1 of category B and at least one customer facility of category C among the available combinations of the customer facilities 1 of categories B and C, so that the customer facilities 1 of categories B and C have deficient electric energy and excess electric energy in closest sub-intervals of the unit time interval, respectively. In addition, the grouping circuit 23 may combine at least one customer facility 1 of category A and at least one customer facility 1 of category C among the available combinations of the customer facilities 1 of categories A and C, so that the customer facilities 1 of categories A and C are located at locations closest to each other. In addition, the grouping circuit 23 may combine at least one customer facility 1 of category B and at least one customer facility 1 of category C among the available combinations of the customer facilities 1 of categories B and C, so that the customer facilities 1 of categories A and C are located at locations closest to each other.

When forming groups of the customer facilities 1, the grouping circuit 23 may consider both time of occurrence of the excess electric energy and the deficient electric energy, and locations of the customer facilities 1.

FIG. 11 is a table showing exemplary groups formed by performing the grouping process of FIG. 10. In the example of FIG. 11, the power system includes customer facilities 1 of category A (A-1, A-2, A-3) and customer facilities 1 of category B (B-1, B-2, B-3). Groups are formed by combining the customer facilities A-1 and B-1 located at the same location or at locations close to each other, combining the customer facilities A-2 and B-2 located at the same location or at locations close to each other, and combining the customer facilities A-3 and B-3 located at the same location or at locations close to each other, so that the excess electric energy and the deficient electric energy occurring at the same time or at times close to each other are substantially cancelled with each other.

When forming groups of the customer facilities 1, it is also possible to further consider results of past grouping, a success ratio of transmitting and receiving power among the customer facilities 1, and the like.

Referring again to FIG. 7, in step S4, the power transmitting and receiving controller circuit 24 of the power controller apparatus 4 calculates total demand power, total generated power, and total stored energy of the customer facilities 1 of each group, based on the predicted demand power, the predicted generated power, and the predicted inherent stored energy of each customer facility 1, based on the calculated excess electric energy and the calculated deficient electric energy of each customer facility 1, and based on the groups of the customer facilities 1.

In step S5, the power transmitting and receiving controller circuit 24 determines transmitting power and receiving power of each customer facility 1 of each group. In this case, the power transmitting and receiving controller circuit 24 determines the transmitting power and the receiving power, so that in each customer facility 1, excess electric energy and deficient electric energy do not occur, stored energy does not reach the upper-limit stored energy and the lower-limit stored energy, and variations of the stored energy are minimized. For each group including the customer facilities 1 of category A and B, the power transmitting and receiving controller circuit 24 determines transmitting power from the customer facility 1 of category A to the customer facility 1 of category B, so that stored energy of the battery apparatus 13 of each of the customer facilities 1 is equal to or less than the upper-limit stored energy, and equal to or more than the lower-limit stored energy, over the unit time interval. For each group including the customer facilities 1 of categories A to C, the power transmitting and receiving controller circuit 24 determines transmitting power from the customer facility 1 of category A to the customer facility 1 of category C, and transmitting power from the customer facility 1 of category C to the customer facility 1 of category B, so that stored energy of the battery apparatus 13 of each of the customer facilities 1 is equal to or less than the upper-limit stored energy, and equal to or more than the lower-limit stored energy, over the unit time interval. The power transmitting and receiving controller circuit 24 controls the customer facility 1 of category D not to transmit nor receive power to and from the other customer facilities 1.

In step S6, the power transmitting and receiving controller circuit 24 instructs each customer facility 1 to transmit and receive power.

In step S7, the reconfiguration determiner circuit 25 of the power controller apparatus 4 determines whether or not a trigger for reconfiguration of power transmitting and receiving among the customer facilities 1 has been detected; if YES, the process returns to step S1, and if NO, step S7 is repeated.

Consider a case in which the customer facilities 1 of each group determined in step S3 transmit and receive the power determined in step S5. In this case, if conditions such as the demand power and the generated power change, the inherent stored energy, the excess electric energy, and the deficient electric energy also change. Thus, new excess electric energy or new deficient electric energy occur, and it may not be possible to transmit or receive power using fixed groups, a fixed transmitting power, and a fixed the receiving power. Therefore, the reconfiguration determiner circuit 25 reconfigures power transmitting and receiving among the customer facilities 1, when detecting any of the following triggers.

For example, as a first trigger, power transmitting and receiving may be reconfigured for each unit time interval. As a result, it is possible to follow variations of demand power for each day of the week, and variations of demand power depending on weekdays or holidays.

For example, as a second trigger, when at least one of the demand power, the generated power, and the inherent stored energy which are newly predicted by the predictor circuit 21 is different from the power demand, the generated power, and the inherent stored energy which are previously predicted by the predictor circuit 21, power transmitting and receiving may be reconfigured.

For example, as a third trigger, when at least one of actual demand power and actual generated power is different from the demand power and the generated power which are previously predicted by the predictor circuit 21, power transmitting and receiving may be reconfigured. In this way, it is possible to deal with interruption of transmitting and receiving power, due to unexpected disaster, accidents, and the like.

For example, as a fourth trigger, when detecting a failure or power interruption of the customer facilities 1 or the power network 2, power transmitting and receiving may be reconfigured. As a result, it is possible to deal with interruption of transmitting and receiving power, e.g., caused by the failure of the customer facilities 1 (the load apparatus 11, the power generator apparatus 12, the battery apparatus 13) and the power network 2.

For example, as a fifth trigger, when the customer facilities 1 have failed to transmit and receive power as instructed by the power controller apparatus 4, due to an unknown cause, power transmitting and receiving may be reconfigured. It is also possible to deal with a case in which power transmitting and receiving has been interrupted for an unknown cause, and may or may not be interrupted afterwards.

The third to fifth triggers are detected after interruption of the power transmitting and receiving, and on the other hand, the first and second triggers can be detected in advance. When a difference between the actual demand power and the predicted demand power, and a difference between the actual generated power and the predicted generated power are larger than their tolerances, power transmitting and receiving may be interrupted for a certain time interval. However, by using the first or second trigger, it is possible to avoid such interruption of transmitting and receiving power.

When detecting a trigger for reconfiguration of power transmitting and receiving among the customer facilities 1, the reconfiguration determiner circuit 25 instructs the predictor circuit 21, the excess and deficient electric energy calculator circuit 22, the grouping circuit 23, and the power transmitting and receiving controller circuit 24 to reconfigure themselves, as described above.

With reference to FIGS. 12A to 13B, we describe examples in which it is necessary to reconfigure power transmitting and receiving among the customer facilities 1.

Figure 12A:
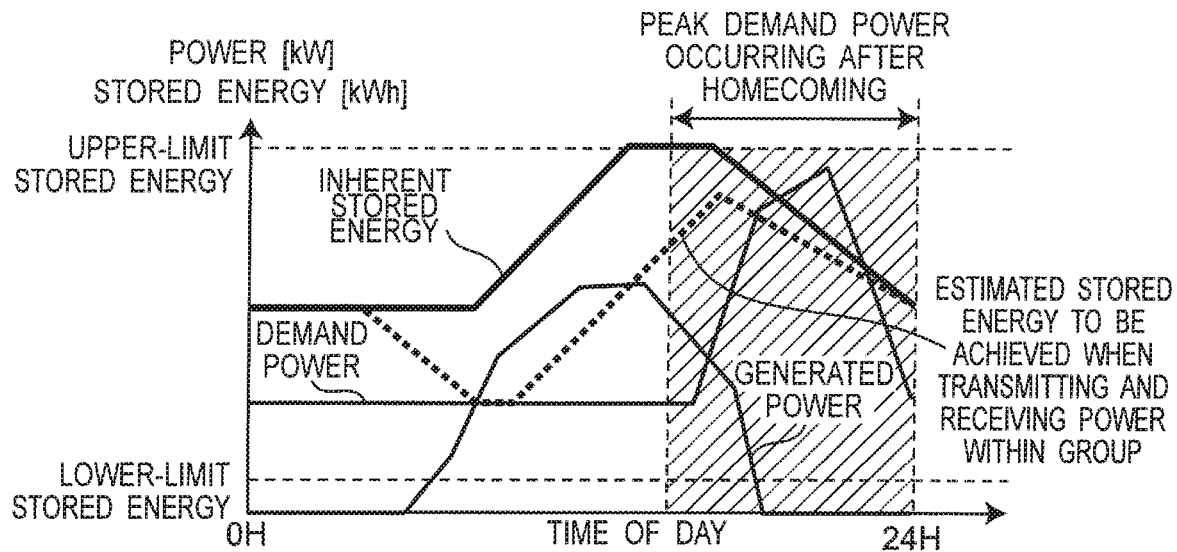
FIG. 12A is a diagram showing variations over time of demand power, generated power, inherent stored energy, and estimated stored energy of a customer facility 1, predicted based on the time of a user's homecoming, the estimated stored energy achieved when transmitting and receiving power within a group.
Figure 12B:
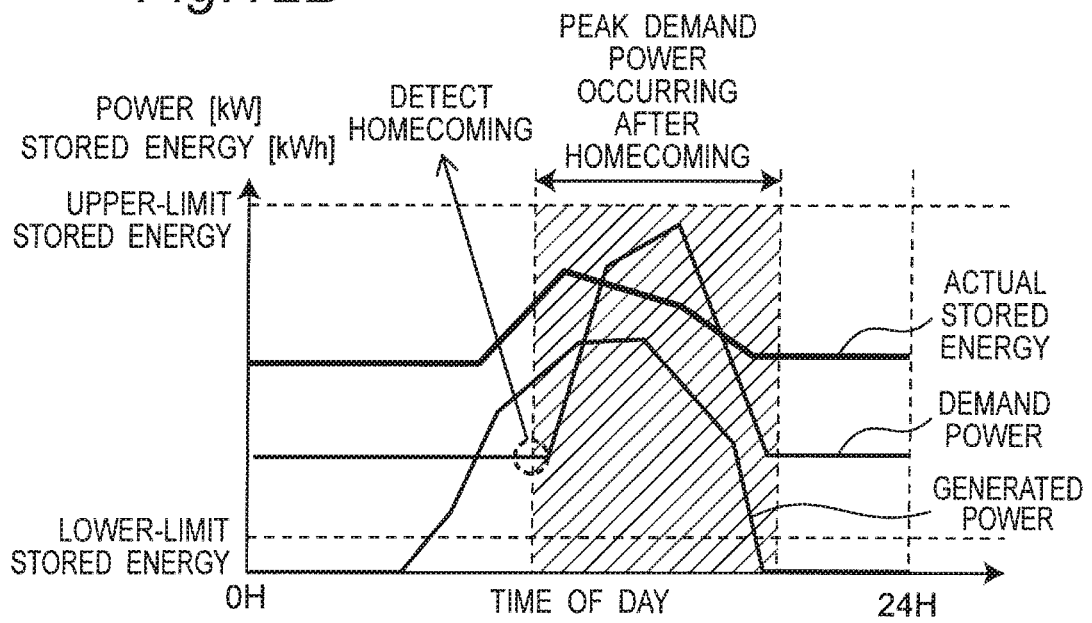
FIG. 12B is a diagram showing variations over time of the actual demand power, actual generated power, and actual stored energy of the same customer facility 1 as that of FIG. 12A.

FIG. 12A is a diagram showing variations over time of demand power, generated power, inherent stored energy, and estimated stored energy of a customer facility 1, predicted based on the time of a user's homecoming, the estimated stored energy to be achieved when transmitting and receiving power within a group. FIG. 12B is a diagram showing variations over time of actual demand power, actual generated power, and actual stored energy of the same customer facility 1 as that of FIG. 12A. According to FIG. 12A, it is predicted that, before the user comes home and the demand power increases, the inherent stored energy reaches the upper-limit stored energy, and excess electric energy occurs. The power controller apparatus 4 instructs to transmit power to the other customer facilities 1. However, according to FIG. 12B, since the user comes home early, and the excess electric energy does not occur, it is not necessary to transmit power to the other customer facilities 1. Therefore, when detecting that the user comes home, the power controller apparatus 4 reconfigures power transmitting and receiving so as not to transmit power to the other customer facilities 1.

Figure 13A:
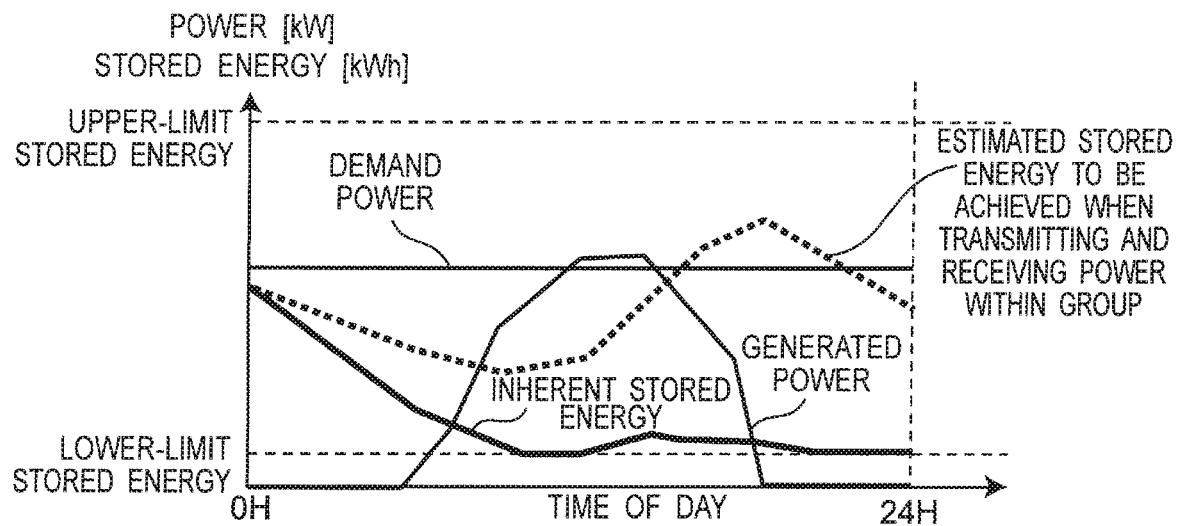
FIG. 13A is a diagram showing variations over time of demand power, generated power, inherent stored energy, and estimated stored energy of a customer facility 1, predicted based on weather, the estimated stored energy achieved when transmitting and receiving power within a group.
Figure 13B:
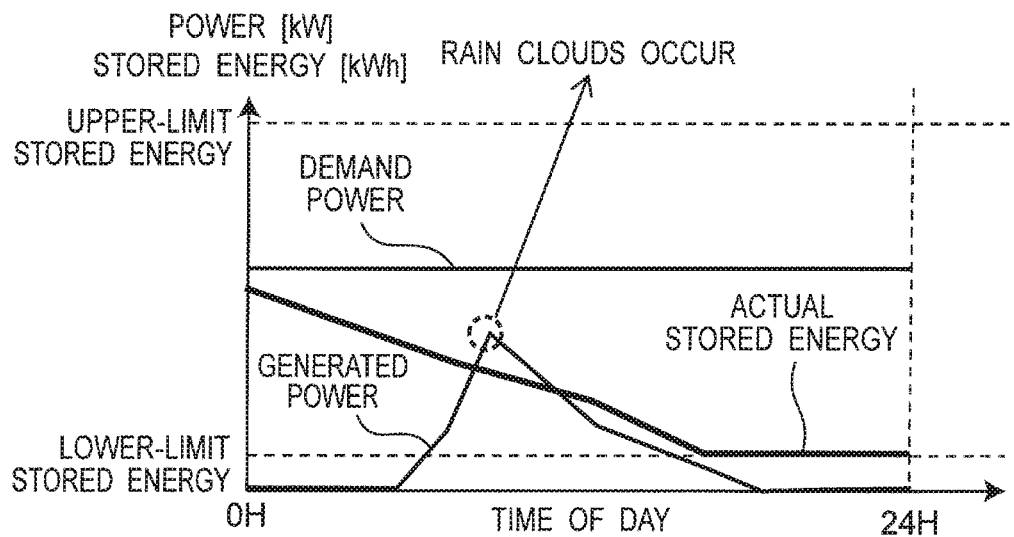
FIG. 13B is a diagram showing variations over time of the actual demand power, actual generated power, and actual stored energy of the same customer facility 1 as that of FIG. 13A.

FIG. 13A is a diagram showing variations over time of demand power, generated power, inherent stored energy, and estimated stored energy of a customer facility 1, predicted based on weather, the estimated stored energy to be achieved when transmitting and receiving power within a group. FIG. 13B is a diagram showing variations over time of actual demand power, actual generated electric power, and actual stored energy of the same customer facility 1 as that of FIG. 13A. According to FIG. 13A, the generated power of the power generator apparatus 12, which is a solar cell, is predicted based on weather information. On the other hand, according to FIG. 13B, the generated power is reduced due to generation of rain clouds. Therefore, when detecting a change of weather, the power controller apparatus 4 reconfigures power transmitting and receiving.

According to the power system of the first embodiment, it is possible to control transmitting and receiving power among the customer facilities 1 using small-capacity battery apparatuses 13, so as to efficiently and stably supply power to load apparatuses 11, and so as to prevent the battery apparatuses 13 from degrading, with a low computational burden.

According to the power system of the first embodiment, at least one group of the customer facilities 1 each provided with the battery apparatus 13 is formed, and power is transmitted and received between the customer facilities 1 of each group. Therefore, it is possible to efficiently and stably supply power to the load apparatuses 11 of the customer facilities 1, using small-capacity battery apparatuses 13.

According to the power system of the first embodiment, each of the customer facilities 1 transmits excess electric energy to the other customer facilities 1, the excess electric energy occurring when stored energy of the battery apparatus 13 has reached the upper-limit stored energy, and receives deficient electric energy from the other customer facilities 1, the deficient electric energy occurring when stored energy of the battery apparatus 13 has reached the lower-limit stored energy. Thus, since the stored energy of the battery apparatus 13 of each of the customer facilities 1 can be equal to or less than the upper-limit stored energy, and equal to or more than the lower-limit stored energy, it is possible to prevent the battery apparatuses 13 from degrading. In addition, since an amount of power to be transmitted and received is minimized, it is possible to reduce loss of transmitting and receiving power.

According to the power system of the first embodiment, demand power, generated power, and inherent stored energy in a unit time interval are predicted, and groups are formed by combining a customer facility 1 having excess electric energy in the unit time interval, and a customer facility 1 having deficient electric energy in the unit time interval. Thus, it is possible to determine transmitting power and receiving power of each of the customer facilities 1 in consideration of demand power, generated power, and inherent stored energy in a future sub-interval of the unit time interval. Therefore, for example, in the customer facility 1 where large demand power is predicted to occur in a future sub-interval of the unit time interval, it is possible to reduce power to be transmitted to the other customer facilities 1, and reserve the stored energy. If it is determined whether or not to transmit power to the other customer facilities 1 only based on current instantaneous stored energy, power may be transmitted to the other customer facility 1 to reduce the stored energy, despite that large demand power occurs in a future sub-interval. Thereafter, when large demand actually occurs, the stored energy is deficient, and it is necessary to receive power from the other customer facilities 1. According to the power system of the first embodiment, it is possible to prevent the customer facilities 1 from transmitting and receiving power in a lossy manner, by considering total demand power, total generated power, and total inherent stored energy in the unit time interval.

According to the power system of the first embodiment, when forming groups of customer facilities 1, it is possible to reduce a computational burden by clustering the customer facilities 1 depending on whether or not to have excess electric energy and deficient electric energy, and depending on amounts of excess electric energy and deficient electric energy. For example, when not using clustering, it is necessary to determine whether or not to transmit and receive power for all combinations of the customer facilities 1, and therefore, it imposes a very high computational burden, and there is no guarantee for real-time control. On the other hand, when using clustering as shown in FIGS. 8 to 11, it is sufficient to determine to whether or not to transmit and receive power between each combination of customer facilities 1 having excess power and deficient power, respectively, close to each other in the unit time interval, and therefore, it is possible to reduce the computational burden. It is not necessary to determine whether or not to transmit and receive power for customer facilities 1 having neither excess electric energy nor deficient electric energy, and therefore, it is possible to further reduce the computational burden.

According to the power system of the first embodiment, it is possible to balance demand power and supply power in each group. Variations in the stored energy would be minimized by forming groups of customer facilities 1 so as to balance the demand power and the supply power.

According to the power system of the first embodiment, while minimizing a capacity of the battery apparatus 13 of each of the customer facilities 1, it is possible to efficiently consume generated power (i.e., reduce an amount of sold power) by the customer facility 1 itself, or by the other customer facility 1 in the same group.

According to the power system of the first embodiment, groups of customer facilities 1 may be formed so as to minimize the number of times to reconfigure power transmitting and receiving among the customer facilities 1 (e.g., so that it is not necessary to reconfigure power transmitting and receiving in a time shorter than a unit time interval).

Second Embodiment

The power controller apparatus 4 may change at least one of the upper-limit stored energy and the lower-limit stored energy of the battery apparatus 13 of each of the customer facilities 1, depending on whether a normal mode with available commercial power, or an emergency mode without available commercial power due to power interruption and the like. Thus, in an emergency, it is possible to increase amounts of charged power and discharged power of the battery apparatus 13.

A power system according to the second embodiment is configured in a manner similar to that of the power system according to the first embodiment.

Figure 14:
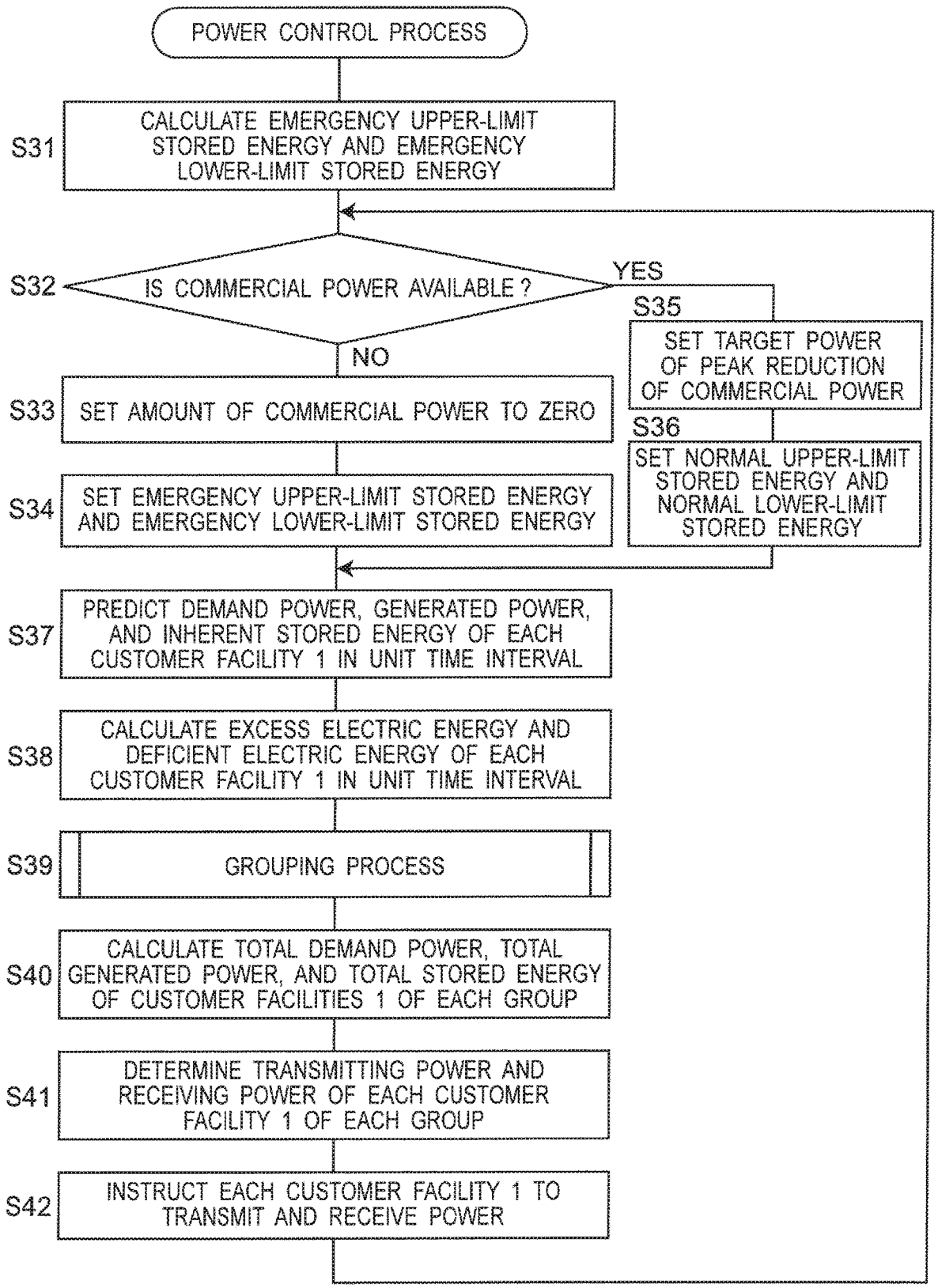
FIG. 14 is a flowchart showing a power control process performed by a power controller apparatus 4 of a power system according to a second embodiment.

FIG. 14 is a flowchart showing a power control process performed by the power controller apparatus 4 of the power system according to the second embodiment.

In step S31, the power controller apparatus 4 calculates an upper-limit stored energy and a lower-limit stored energy for the emergency mode. The upper-limit stored energy and the lower-limit stored energy for the emergency mode are upper and lower limits of the stored energy, respectively, determined so that the battery apparatus 13 can operate for a long term without applying an excessive burden on the battery apparatus 13, and without significantly degrading the battery apparatus 13. For example, the upper-limit stored energy for the emergency mode may be set higher than the upper-limit stored energy for the normal mode, and the lower-limit stored energy for the emergency mode may be set lower than the lower-limit stored energy for the normal mode.

In step S32, the power controller apparatus 4 determines whether or not commercial power is available; if YES, the process proceeds to step S35, and if NO, the process proceeds to step S33.

In step S33, the power controller apparatus 4 sets an amount of commercial power to zero in the excess and deficient electric energy calculator circuit 22, the amount of commercial power to be used when calculating the excess electric energy and the deficient electric energy. In step S34, the power controller apparatus 4 sets the upper-limit stored energy and the lower-limit stored energy for the emergency mode in the excess and deficient electric energy calculator circuit 22.

In step S35, the power controller apparatus 4 sets an amount of target power of peak reduction for the commercial power in the excess and deficient electric energy calculator circuit 22, the amount of target power to be used when calculating the excess electric energy and the deficient electric energy. In step S36, the power controller apparatus 4 sets the upper-limit stored energy and the lower-limit stored energy for the normal mode in the excess and deficient electric energy calculator circuit 22.

Steps S37 to S42 are the same as steps S1 to S6 in FIG. 7. However, when the commercial power is not available, groups may be formed by combining customer facilities 1 of categories A to C with customer facilities 1 of category D, in the grouping process of step S39. By transmitting and receiving power to and from the customer facilities 1 of category D, it is possible to effectively use the battery apparatuses 13 of the customer facilities 1 of category D in the emergency mode.

After step S42, it may be determined whether or not a trigger for reconfiguration of power transmitting and receiving among the customer facilities 1 has been detected, in a manner similar to that of step S7 of FIG. 7.

According to the power system of the second embodiment, it is possible to effectively use the battery apparatuses 13 of the customer facilities 1 in the emergency mode, by changing at least one of the upper-limit stored energy and the lower-limit stored energy depending on whether or not the commercial power is available. By using the upper-limit stored energy and the lower-limit stored energy for the emergency mode, it is possible to reserve a buffer of stored energy for the emergency mode.

Third Embodiment

Customer facilities of a power system are not limited to those equipped with all the load apparatus 11, the power generator apparatus 12, and the battery apparatus 13 as shown in FIG. 1. The power system may include a customer facility without the power generator apparatus 12, and may include a customer facility without the battery apparatus 13.

Figure 15:
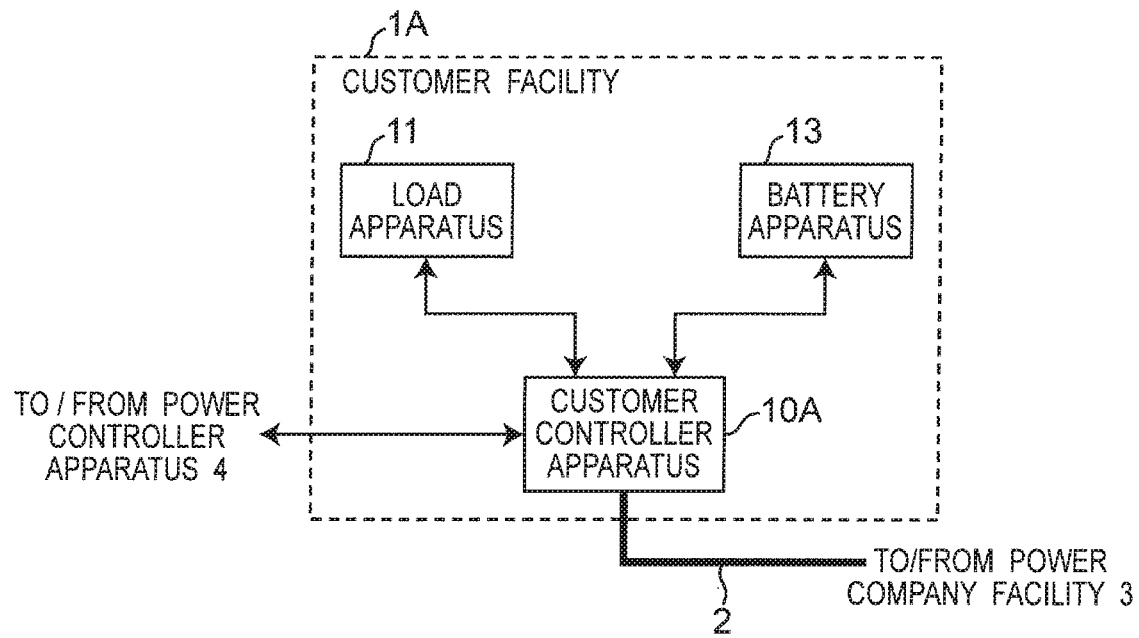
FIG. 15 is a block diagram showing a configuration of a customer facility 1A included in a power system according to a third embodiment.

FIG. 15 is a block diagram showing a configuration of a customer facility 1A included in a power system according to a third embodiment. The customer facility 1A is provided with a customer controller apparatus 10A, a load apparatus 11, and a battery apparatus 13. The customer controller apparatus 10A is configured in a manner similar to that of the customer controller apparatus 10 of FIG. 1, except for not monitoring generated power of a power generator apparatus.

Figure 16:
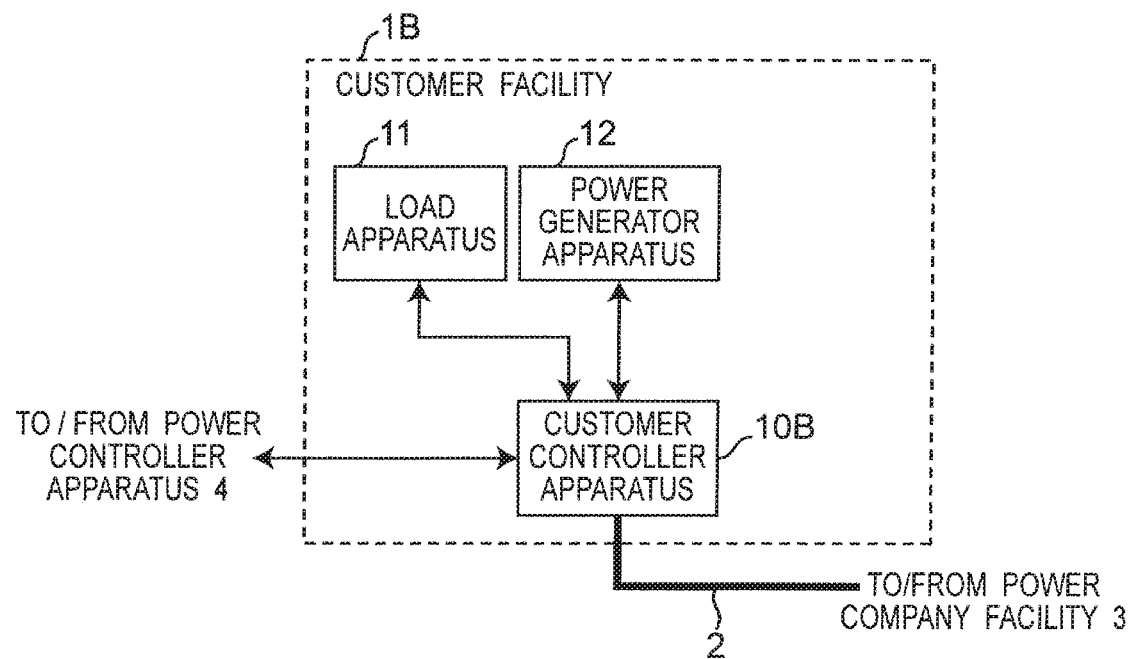
FIG. 16 is a block diagram showing a configuration of a customer facility 1B included in the power system according to the third embodiment.

FIG. 16 is a block diagram showing a configuration of a customer facility 1B included in the power system according to the third embodiment. The customer facility 1B is provided with a customer controller apparatus 10B, a load apparatus 11, and a power generator apparatus 12. The customer controller apparatus 10B is configured in a manner similar to that of the customer controller apparatus 10 of FIG. 1, except for not monitoring stored energy of a battery apparatus.

Figure 17:
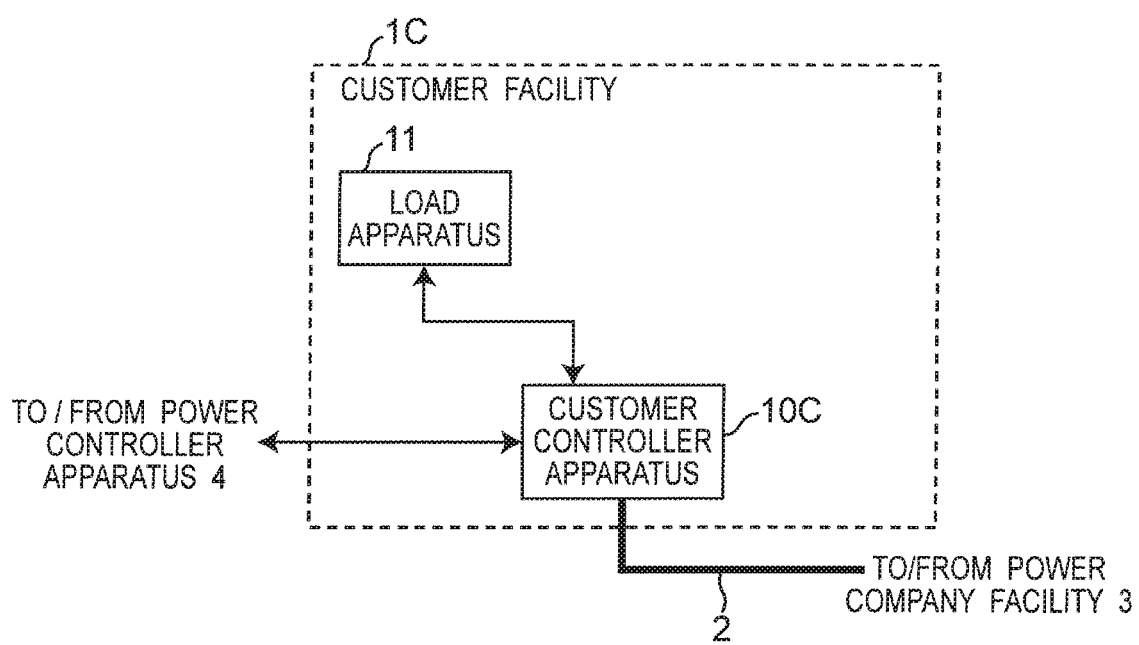
FIG. 17 is a block diagram showing a configuration of a customer facility 1C included in the power system according to the third embodiment.

FIG. 17 is a block diagram showing a configuration of a customer facility 1C included in the power system according to the third embodiment. The customer facility 1C is provided with a customer controller apparatus 10C and a load apparatus 11. The customer controller apparatus 10C is configured in a manner similar to that of the customer controller apparatus 10 of FIG. 1, except for not monitoring generated power of a power generator apparatus 12 and stored energy of a battery apparatus.

In the power system according to the third embodiment, all the customer facilities (the customer facilities 1, 1A to 1C) are provided with the load apparatuses 11. In the power system according to the third embodiment, at least one of the customer facilities (the customer facilities 1, 1B) is further provided with the power generator apparatus 12. In the power system according to the third embodiment, at least two of the customer facilities (the customer facilities 1, 1A) are further provided with the battery apparatuses 13. In the following description, the power system according to the third embodiment includes all of the customer facility 1 of FIG. 1, the customer facility 1A of FIG. 15, the customer facility 1B of FIG. 16, and the customer facility 1C of FIG. 17.

The power controller apparatus 4 according to the third embodiment is configured in a manner similar to that of the power controller apparatus 4 according to the first embodiment. For example, as shown in FIG. 2, the power controller apparatus 4 is provided with a predictor circuit 21, an excess and deficient electric energy calculator circuit 22, a grouping circuit 23, a power transmitting and receiving controller circuit 24, and a reconfiguration determiner circuit 25.

For each of the customer facilities 1, 1B provided with the power generator apparatus 12, the predictor circuit 21 predicts generated power of the power generator apparatus 12 of each of the customer facilities 1, 1B in a unit time interval. For each of the customer facilities 1, 1A provided with the battery apparatus 13, the predictor circuit 21 predicts inherent stored energy indicating stored energy of the battery apparatus 13 of each of the customer facilities 1, 1A in the unit time interval, the inherent stored energy achieved when power is not transmitted to and received from the other customer facilities 1, 1A to 1C.

For each of the customer facilities 1 provided with the power generator apparatus 12 and the battery apparatus 13, the excess and deficient electric energy calculator circuit 22 calculates excess electric energy generated by the power generator apparatus 12 and not consumed by the load apparatus 11 when the inherent stored energy reaches the upper-limit stored energy, in the unit time interval, based on demand power, generated power, and inherent stored energy. For each of the customer facilities 1, 1A provided with the battery apparatus 13, the excess and deficient electric energy calculator circuit 22 calculates deficient electric energy having to be supplied from the other customer facilities 1, 1A to 1C when the inherent stored energy reaches the lower-limit stored energy in the unit time interval, based on demand power and inherent stored energy, or based on demand power, generated power, and inherent stored energy. For each of the customer facilities 1B provided with the power generator apparatus 12 and without the battery apparatus 13, the excess and deficient electric energy calculator circuit 22 calculates excess electric energy generated by the power generator apparatus 12 and not consumed by the load apparatus 11 in the unit time interval, and calculates deficient electric energy having to be supplied from the other customer facilities 1, 1A to 1C in the unit time interval, based on demand power and generated power. For each of the customer facilities 1C without the power generator apparatus 12 nor the battery apparatus 13, the excess and deficient electric energy calculator circuit 22 calculates deficient electric energy having to be supplied from the other customer facilities 1, 1A to 1C in the unit time interval, based on demand power.

In the customer facility 1 of FIG. 1 and the customer facility 1B of FIG. 16, both the excess electric energy and the deficient electric energy may occur. On the other hand, in the customer facility 1A of FIG. 15 and the customer facility 1C of FIG. 17, the deficient electric energy may occur, but excess electric energy does not occur since the power generator apparatus is not provided.

The grouping circuit 23 combines at least one first customer facility 1, 1B and at least one second customer facility 1, 1A to 1C among the plurality of customer facilities 1, 1A to 1C, so as to include at least one customer facility 1, 1A provided with the battery apparatus 13, the first customer facility having the excess electric energy in the unit time interval, and the second customer facility having the deficient electric energy in the unit time interval, and thus, the grouping circuit 23 forms at least one group including the first and second customer facilities 1, 1A to 1C. The power controller apparatus 4 combines at least one first customer facility 1, 1B, at least one second customer facility 1, 1A to 1C, and at least one third customer facility 1, 1B among the plurality of customer facilities 1, 1A to 1C, so as to include at least one customer facility 1, 1A provided with the battery apparatus 13, the first customer facility having the excess electric energy in the unit time interval, the second customer facility having the deficient electric energy in the unit time interval, and the third customer facility having both the excess electric energy and the deficient electric energy in the unit time interval, and thus, the power controller apparatus 4 forms at least one group including the first to third customer facilities 1, 1A to 1C.

For each group including the first and second customer facilities 1, 1A to 1C, the power transmitting and receiving controller circuit 24 determines transmitting power from the first customer facility 1, 1B to the second customer facility 1, 1A to 1C, so that stored energy of the battery apparatus 13 of each of the customer facilities 1 provided with the battery apparatus 13 is equal to or less than the upper-limit stored energy, and equal to or more than the lower-limit stored energy, over the unit time interval. For each group including the first to third customer facilities 1, 1A to 1C, the power transmitting and receiving controller circuit 24 determines transmitting power from the first customer facility 1, 1B to the third customer facility 1, 1B, and transmitting power from the third customer facility 1, 1B to the second customer facility 1, 1A to 1C, so that stored energy of the battery apparatus 13 of each of the customer facilities 1, 1A provided with the battery apparatus 13 is equal to or less than the upper-limit stored energy, and equal to or more than the lower-limit stored energy, over the unit time interval.

For example, the groups of customer facilities 1, 1A to 1C are formed as follows.

The grouping circuit 23 may combines at least one first customer facility 1, 1B and at least one second customer facility 1, 1A to 1C among the plurality of customer facilities 1, 1A to 1C, so that the first and second customer facilities 1, 1A to 1C have total excess electric energy and total deficient electric energy, respectively, closest to each other in the unit time interval, and thus, form at least one group including the first and second customer facilities 1, 1A to 1C. In addition, the grouping circuit 23 may combine at least one first customer facility 1, 1B and at least one third customer facility 1, 1B among the plurality of customer facilities 1, 1A to 1C, so that the first and third customer facilities have total excess electric energy and total deficient electric energy, respectively, closest to each other in the unit time interval, combine at least one second customer facility 1, 1A to 1C and at least one third customer facility 1, 1B among the plurality of customer facilities 1, 1A to 1C, so that the second and third customer facilities have total deficient electric energy and total excess electric energy, respectively, closest to each other in the unit time interval, and thus, form at least one group including the first to third customer facilities 1, 1A to 1C.

When there are a plurality of available combinations of at least one first customer facility 1, 1B and at least one second customer facility 1, 1A to 1C having total excess electric energy and total deficient electric energy, respectively, closer to each other than a third threshold in the unit time interval, the grouping circuit 23 may form at least one group including the first and second customer facilities 1, 1A to 1C as follows. The grouping circuit 23 may combine at least one first customer facility 1, 1B and at least one second customer facility 1, 1A to 1C among the available combinations of the first and second customer facilities 1, 1A to 1C, so that first and second customer facilities have excess electric energy and deficient electric energy in closest sub-intervals of the unit time interval, respectively. The grouping circuit 23 may combine at least one first customer facility 1, 1B and at least one second customer facility 1, 1A to 1C among the available combinations of the first and second customer facilities 1, 1A to 1C, so that first and second customer facilities are located at locations closest to each other.

When there are a plurality of available combinations of at least one first customer facility 1, 1B and at least one third customer facility 1, 1B having total excess electric energy and total deficient electric energy, respectively, closer to each other than the third threshold in the unit time interval, and there are a plurality of available combinations of at least one second customer facility 1, 1A to 1C and at least one third customer facility 1, 1B having total deficient electric energy and total excess electric energy, respectively, closer to each other than the third threshold in the unit time interval, the grouping circuit 23 may form at least one group including the first to third customer facilities 1, 1A to 1C as follows. The grouping circuit 23 may combine at least one first customer facility 1, 1B and at least one third customer facility 1, 1B among the available combinations of the first and third customer facilities 1, 1B, so that the first and third customer facilities have excess electric energy and deficient electric energy in closest sub-intervals of the unit time interval, respectively. The grouping circuit 23 may combine at least one second customer facility 1, 1A to 1C and at least one third customer facility 1, 1B among the available combinations of the second and third customer facilities 1, 1A to 1C, so that the second and third customer facilities have deficient electric energy and excess electric energy in closest sub-intervals of the unit time interval, respectively. The grouping circuit 23 may combine at least one first customer facility 1, 1B and at least one third customer facility 1, 1B among the available combinations of the first and third customer facilities 1, 1B, so that the first and third customer facilities are located at locations closest to each other. The grouping circuit 23 may combine at least one second customer facility 1, 1A to 1C and at least one third customer facility 1, 1B among the available combinations of the second and third customer facilities 1, 1A to 1C, so that the second and third customer facilities are located at locations closest to each other.

When forming groups of the customer facilities 1, 1A to 1C, the grouping circuit 23 may consider both time of occurrence of the excess electric energy and the deficient electric energy, and locations of the customer facilities 1, 1A to 1C.

In the power system according to the third embodiment, a group including only the customer facility 1C is not formed. This is because the customer facility 1C of FIG. 17 has no excess electric energy. On the other hand, in the power system according to the third embodiment, a group(s) including only the customer facilities 1A of FIG. 15 may be formed, and a group(s) including the customer facility 1A of FIG. 15 and the customer facility 1C of FIG. 17 may be formed. In such groups, the battery apparatus may be charged with commercial power (such as nighttime power). However, such groups are not formed when the commercial power is not available due to power interruption and the like.

According to the power system of the third embodiment, even if there is a customer facility without at least one of a power generator apparatus and a battery apparatus, it is possible to control transmitting and receiving power among the customer facilities 1 using small-capacity battery apparatuses 13, so as to efficiently and stably supply power to load apparatuses 11, and so as to prevent the battery apparatuses 13 from degrading, with a low computational burden.

Fourth Embodiment

Figure 18:
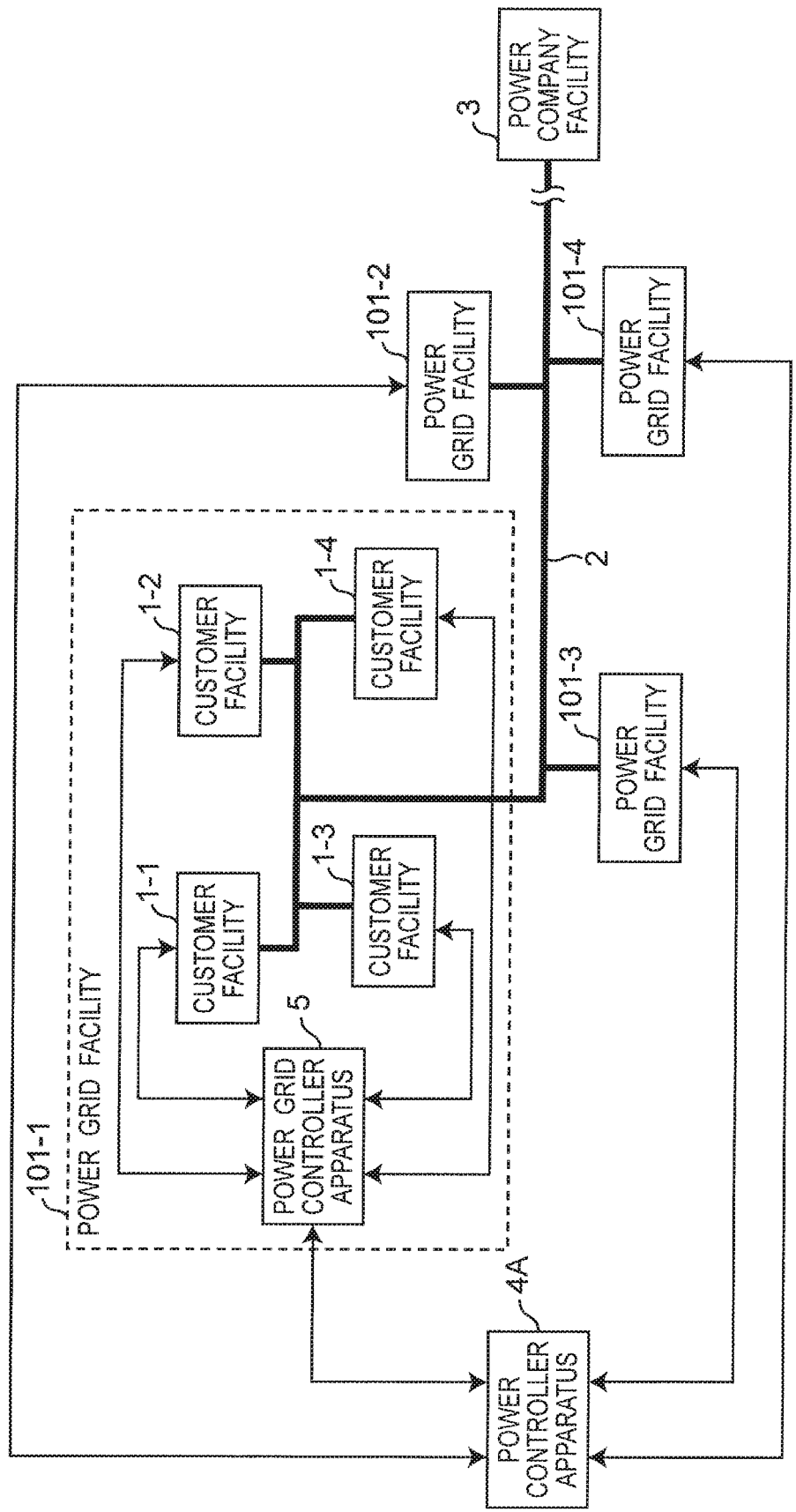
FIG. 18 is a block diagram showing a configuration of a power system according to a fourth embodiment.

FIG. 18 is a block diagram showing a configuration of a power system according to a fourth embodiment. The power system of FIG. 18 includes a plurality of power grid facilities 101-1 to 101-4, a power network 2, a power company facility 3, and a power controller apparatus 4A.

The power grid facility 101-1 includes a plurality of customer facilities 1-1 to 1-4 and a power grid controller apparatus 5. The customer facilities 1-1 to 1-4 of the power grid facility 101-1 are configured in a manner similar to those of the customer facility 1 of FIG. 1, the customer facility 1A of FIG. 15, the customer facility 1B of FIG. 16, or the customer facility 10 of FIG. 17. The power grid controller apparatus 5 monitors demand power of a load apparatus 11, generated power of a power generator apparatus 12, and stored energy of a battery apparatus 13 of each customer facility 1 in the power grid facility 101-1, and notifies the power controller apparatus 4A of the monitored results.

The other power grid facilities 101-2 to 101-4 are also configured in a manner similar to that of the power grid facility 101-1. In the present specification, the power grid facilities 101-1 to 101-4 are collectively referred to as "power grid facilities 101".

The power controller apparatus 4A is configured in a manner substantially similar to that of the power controller apparatus 4 of FIG. 2, and provided with a predictor circuit, an excess and deficient electric energy calculator circuit, a grouping circuit, a power transmitting and receiving controller circuit, and a reconfiguration determiner circuit.

The predictor circuit of the power controller apparatus 4A predicts demand power of the load apparatus 11 of each of the power grid facilities 101 in a unit time interval. For each of the power grid facilities 101 provided with the power generator apparatus 12, the predictor circuit of the power controller apparatus 4A predicts generated power of the power generator apparatus 12 of each of the power grid facilities 101 in the unit time interval. For each of the power grid facilities 101 provided with the battery apparatus 13, the predictor circuit of the power controller apparatus 4A predicts inherent stored energy indicating stored energy of the battery apparatus 13 of each of the power grid facilities 101 in the unit time interval, the inherent stored energy achieved when power is not transmitted to and received from the other power grid facility 101.

For each of the power grid facilities 101 provided with the power generator apparatus 12 and the battery apparatus 13, the excess and deficient electric energy calculator circuit of the power controller apparatus 4A calculates excess electric energy generated by the power generator apparatus 12 and not consumed by the load apparatus 11 when the inherent stored energy reaches a first threshold, in the unit time interval, based on demand power, generated power, and inherent stored energy. For each of the power grid facilities 101 provided with the battery apparatus 13, the excess and deficient electric energy calculator circuit of the power controller apparatus 4A calculates deficient electric energy having to be supplied from the other power grid facility 101 when the inherent stored energy reaches a second threshold smaller than the first threshold, in the unit time interval, based on demand power and inherent stored energy, or based on demand power, generated power, and inherent stored energy.

The grouping circuit of the power controller apparatus 4A combines at least one first power grid facility 101 and at least one second power grid facility 101 among the power grid facilities 101 provided with the battery apparatus 13, the first power grid facility 101 having excess electric energy in the unit time interval, and the second power grid facility 101 having deficient electric energy in the unit time interval, and thus, forms at least one group including the first and second power grid facilities 101.

For each group including the first and second power grid facilities 101, the power transmitting and receiving controller circuit of the power controller apparatus 4A determines transmitting power from the first power grid facility 101 to the second power grid facility 101, so that the stored energy of the battery apparatus 13 of each of the first and second power grid facilities 101 is equal to or less than the first threshold, and equal to or more than the second threshold, over the unit time interval.

Figure 19:
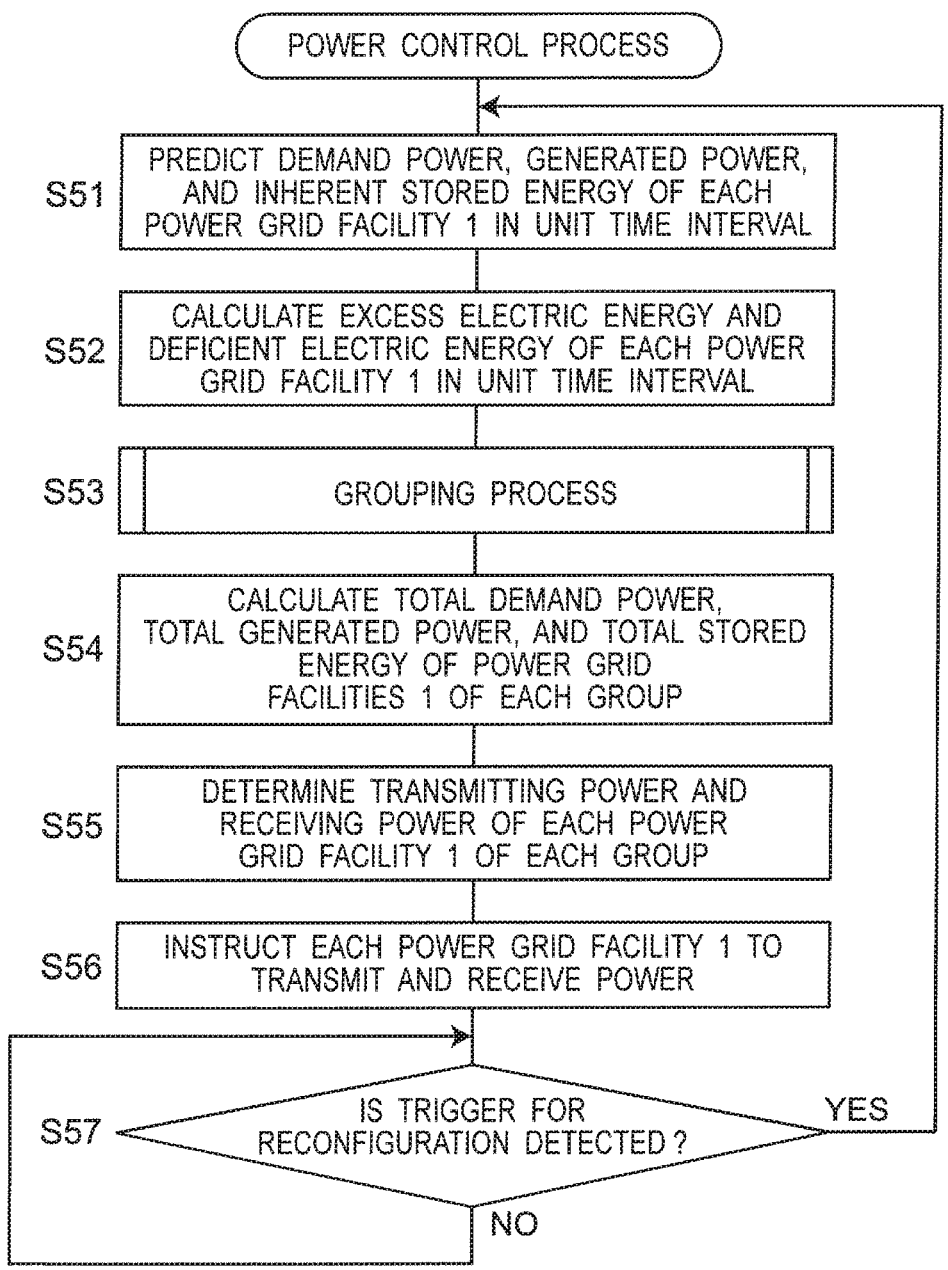
FIG. 19 is a flowchart showing a power control process performed by a power controller apparatus 4A of FIG. 18.

FIG. 19 is a flowchart showing a power control process executed by the power controller apparatus 4A of FIG. 18.

In step S51, the predictor circuit of the power controller apparatus 4A predicts demand power, generated power, and inherent stored energy of each of the power grid facilities 101 in a unit time interval, based on current demand power, current generated power, and current inherent stored energy of each of the power grid facilities 101.

In step S52, the excess and deficient electric energy calculator circuit of the power controller apparatus 4A calculates excess electric energy and deficient electric energy of each of the power grid facilities 101 in the unit time interval, based on the predicted demand power, the predicted generated power, and the predicted inherent stored energy.

In step S53, the grouping circuit of the power controller apparatus 4A executes a grouping process.

In step S54, the power transmitting and receiving controller circuit of the power controller apparatus 4A calculates total demand power, total generated power, and total stored energy of the power grid facility 101 of each group, based on the predicted demand power, the predicted generated power, and the predicted inherent stored energy of each power grid facility 101, based on the calculated excess electric energy and the calculated deficient electric energy of each power grid facility 101, and based on groups of the power grid facilities 101.

In step S55, the power transmitting and receiving controller circuit of the power controller apparatus 4A determines transmitting power and receiving power of each power grid facility 101 of each group.

In step S56, the power transmitting and receiving controller circuit of the power controller apparatus 4A instructs each power grid facility 101 to transmit and receive power.

In step S57, the reconfiguration determiner circuit of the power controller apparatus 4A determines whether or not a trigger for reconfiguration of power transmitting and receiving among the plurality of power grid facility 101 has been detected; if YES, the process returns to step S51, and If NO, step S57 is repeated.

According to the power system of the fourth embodiment, it is possible to control transmitting and receiving power among the customer facilities 1 using small-capacity battery apparatuses 13, so as to efficiently and stably supply power to load apparatuses 11, and so as to prevent the battery apparatuses 13 from degrading, with a low computational burden. According to the fourth embodiment, it can be understood that the power system is applicable to a power system larger than the power system according to the first embodiment.

The power systems according to the respective embodiments are also applicable to a power network and customer facilities that are not connected to commercial power.

INDUSTRIAL APPLICABILITY

The power system according to the present disclosure can be implemented as a "local-production and local-consumption power system" in which generated power of a customer facility is consumed by the customer facility itself, or by its neighboring customer facilities. It is possible to reduce initial investment cost of the battery apparatuses, by using small-capacity battery apparatuses. It is possible to minimize variations in stored energy, and operate the battery apparatus 13 over a long term without significant degradation.

REFERENCE SIGNS LIST 1-1 to 1-4, 1A, 1B, 1C: CUSTOMER FACILITY
2: POWER NETWORK
3: POWER COMPANY FACILITY
4, 4A: POWER CONTROLLER APPARATUS
5: POWER GRID CONTROLLER APPARATUS
10, 10A, 10B, 10C: CUSTOMER CONTROLLER APPARATUS
11: LOAD APPARATUS
12: POWER GENERATOR APPARATUS
13: BATTERY APPARATUS
21: PREDICTOR CIRCUIT
22: EXCESS AND DEFICIENT ELECTRIC ENERGY CALCULATOR CIRCUIT
23: GROUPING CIRCUIT
24: POWER TRANSMITTING AND RECEIVING CONTROLLER CIRCUIT
25: RECONFIGURATION DETERMINER CIRCUIT
101-1 to 101-4: POWER GRID FACILITY

The invention claimed is:

1. A power controller apparatus for a power system including a plurality of customer facilities connected with each other via a power network,
   wherein each of the customer facilities comprises a load apparatus, at least one of the customer facilities further comprises a power generator apparatus, and at least two of the customer facilities further comprise battery apparatuses,
   wherein the power controller apparatus comprises a predictor, an excess and deficient electric energy calculator, a group former, and a power transmitting and receiving controller, wherein the predictor predicts demand power of the load apparatus of each of the customer facilities in a unit time interval, wherein, for each of the customer facilities comprising the power generator apparatus, the predictor predicts generated power of the power generator apparatus of each of the customer facilities in the unit time interval, wherein, for each of the customer facilities comprising the battery apparatus, the predictor predicts inherent stored energy indicating stored energy of the battery apparatus of each of the customer facilities in the unit time interval, the inherent stored energy achieved when power is not transmitted to nor received from other customer facilities, wherein, for each of the customer facilities comprising the power generator apparatus and the battery apparatus, the excess and deficient electric energy calculator calculates excess electric energy generated by the power generator apparatus and not consumed by the load apparatus when the inherent stored energy reaches a first threshold, in the unit time interval, based on the demand power, the generated power, and the inherent stored energy, wherein, for each of the customer facilities comprising the battery apparatus, the excess and deficient electric energy calculator calculates deficient electric energy having to be supplied from other customer facilities when the inherent stored energy reaches a second threshold smaller than the first threshold, in the unit time interval, based on the demand power and the inherent stored energy, or based on the demand power, the generated power, and the inherent stored energy, wherein the group former combines at least one first customer facility and at least one second customer facility among the customer facilities comprising the battery apparatuses, the first customer facility having the excess electric energy in the unit time interval, and the second customer facility having the deficient electric energy in the unit time interval, whereby forming at least one group including the first and second customer facilities, and wherein, for each group including the first and second customer facilities, the power transmitting and receiving controller determines transmitting power from the first customer facility to the second customer facility, so that stored energy of each of the battery apparatuses of the first and second customer facilities is equal to or less than the first threshold, and equal to or more than the second threshold, over the unit time interval.

2. The power controller apparatus as claimed in claim 1,
wherein, for each of the customer facilities comprising the power generator apparatus and not comprising the battery apparatus, the excess and deficient electric energy calculator calculates excess electric energy generated by the power generator apparatus and not consumed by the load apparatus in the unit time interval, and deficient electric energy having to be supplied from other customer facilities in the unit time interval, based on the demand power and the generated power, wherein, for each of the customer facilities not comprising the power generator apparatus nor the battery apparatus, the excess and deficient electric energy calculator calculates deficient electric energy having to be supplied from other customer facilities in the unit time interval, based on the demand power, wherein the group former combines at least one first customer facility and at least one second customer facility among the plurality of customer facilities, so as to include at least one customer facility comprising the battery apparatus, the first customer facility having the excess electric energy in the unit time interval, and the second customer facility having the deficient electric energy in the unit time interval, whereby forming at least one group including the first and second customer facilities, and wherein, for each group including the first and second customer facilities, the power transmitting and receiving controller determines transmitting power from the first customer facility to the second customer facility, so that stored energy of each battery apparatus of at least one customer facility comprising the battery apparatus is equal to or less than the first threshold, and equal to or more than the second threshold, over the unit time interval.

3. The power controller apparatus as claimed in claim 1,
wherein the group former combines at least one first customer facility and at least one second customer facility among the plurality of customer facilities, so that the first and second customer facilities have total excess electric energy and total deficient electric energy, respectively, closest to each other in the unit time interval, whereby forming at least one group including the first and second customer facilities.

4. The power controller apparatus as claimed in claim 1,
wherein, when there are a plurality of available combinations of at least one first customer facility and at least one second customer facility having total excess electric energy and total deficient electric energy, respectively, closer to each other than a third threshold in the unit time interval, the group former combines at least one first customer facility and at least one second customer facility among the available combinations of the first and second customer facilities, so that the first and second customer facilities have the excess electric energy and the deficient electric energy in closest sub-intervals of the unit time interval, respectively, whereby forming at least one group including the first and second customer facilities.

5. The power controller apparatus as claimed in claim 1,
wherein, when there are a plurality of available combinations of at least one first customer facility and at least one second customer facility having total excess electric energy and total deficient electric energy, respectively, closer to each other than a third threshold in the unit time interval, the group former combines at least one first customer facility and at least one second customer facility among the available combinations of the first and second customer facilities, so that the first and second customer facilities are located at locations closest to each other, whereby forming at least one group including the first and second customer facilities.

6. The power controller apparatus as claimed in claim 1,
wherein the group former combines at least one first customer facility, at least one second customer facility, and at least one third customer facility among the plurality of customer facilities, so as to include at least one customer facility comprising the battery apparatus, the first customer facility having the excess electric energy in the unit time interval, the second customer facility having the deficient electric energy in the unit time interval, and the third customer facility having both the excess electric energy and the deficient electric energy in the unit time interval, whereby forming at least one group including the first to third customer facilities, and wherein, for each group including the first to third customer facilities, the power transmitting and receiving controller determines transmitting power from the first customer facility to the third customer facility, and transmitting power from the third customer facility to the second customer facility, so that stored energy of each battery apparatus of at least one customer facility comprising the battery apparatus is equal to or less than the first threshold, and equal to or more than the second threshold, over the unit time interval.

7. The power controller apparatus as claimed in claim 6, wherein the group former combines at least one first customer facility and at least one third customer facility among the plurality of customer facilities, so that the first and third customer facilities have total excess electric energy and total deficient electric energy, respectively, closest to each other in the unit time interval, and wherein the group former combines at least one second customer facility and at least one third customer facility among the plurality of customer facilities, so that the second and third customer facilities have total deficient electric energy and total excess electric energy, respectively, closest to each other in the unit time interval, whereby forming at least one group including the first to third customer facilities.

8. The power controller apparatus as claimed in claim 6, wherein, when there are a plurality of available combinations of at least one first customer facility and at least one third customer facility having total excess electric energy and total deficient electric energy, respectively, closer to each other than a third threshold in the unit time interval, the group former combines at least one first customer facility and at least one third customer facility among the available combinations of the first and third customer facilities, so that the first and third customer facilities have the excess electric energy and the deficient electric energy in closest sub-intervals of the unit time interval, respectively, and wherein, when there are a plurality of available combinations of at least one second customer facility and at least one third customer facility having total deficient electric energy and total excess electric energy, respectively, closer to each other than the third threshold in the unit time interval, the group former combines at least one second customer facility and at least one third customer facility among the available combinations of the second and third customer facilities, so that the second and third customer facilities have the deficient electric energy and the excess electric energy in closest sub-intervals of the unit time interval, respectively, whereby forming at least one group including the first to third customer facilities.

9. The power controller apparatus as claimed in claim 6, wherein, when there are a plurality of available combinations of at least one first customer facility and at least one third customer facility having total excess electric energy and total deficient electric energy, respectively, closer to each other than a third threshold in the unit time interval, the group former combines at least one first customer facility and at least one third customer facility among the available combinations of the first and third customer facilities, so that the first and third customer facilities are located at locations closest to each other, and wherein, when there are a plurality of available combinations of at least one second customer facility and at least one third customer facility having total deficient electric energy and total excess electric energy, respectively, closer to each other than the third threshold in the unit time interval, the group former combines at least one second customer facility and at least one third customer facility among the available combinations of the second and third customer facilities, so that the second and third customer facilities are located at locations closest to each other, whereby forming at least one group including the first to third customer facilities.

10. The power controller apparatus as claimed in claim 1, wherein the power transmitting and receiving controller controls a fourth customer facility among the plurality of customer facilities not to transmit nor receive power to and from other customer facilities, the fourth customer facility not having excess electric energy nor deficient electric energy in the unit time interval.

11. The power controller apparatus as claimed in claim 1, wherein the power controller apparatus further comprises a reconfiguration determiner that repeats, in response to a predetermined trigger: predicting the demand power, the generated power, and the inherent stored energy; calculating the excess electric energy and the deficient electric energy; forming the at least one group; and determining the transmitting power.

12. The power controller apparatus as claimed in claim 11, wherein the reconfiguration determiner repeats, for each unit time interval: predicting the demand power, the generated power, and the inherent stored energy; calculating the excess electric energy and the deficient electric energy; forming the at least one group; and determining the transmitting power.

13. The power controller apparatus as claimed in claim 11, wherein, when at least one of the demand power, the generated power, and the inherent stored energy which are newly predicted is different from the demand power, the generated power, and the inherent stored energy which are previously predicted, the reconfiguration determiner repeats: calculating the excess electric energy and the deficient electric energy; forming the at least one group; and determining the transmitting power.

14. The power controller apparatus as claimed in claim 11, wherein, when at least one of actual demand power and actual generated power is different from predicted demand power and predicted generated power, the reconfiguration determiner repeats: predicting the demand power, the generated power, and the inherent stored energy; calculating the excess electric energy and the deficient electric energy; forming the at least one group; and determining the transmitting power.

15. The power controller apparatus as claimed in claim 11, wherein, when detecting a failure of the customer facility or the power network, the reconfiguration determiner repeats: predicting the demand power, the generated power, and the inherent stored energy; calculating the excess electric energy and the deficient electric energy; forming the at least one group; and determining the transmitting power.

16. The power controller apparatus as claimed in claim 1, wherein the customer facilities are connected to a power company facility, and supplied with commercial power from the power company facility.

17. The power controller apparatus as claimed in claim 16,
wherein the excess and deficient electric energy calculator has a setting on target power of peak reduction of the commercial power, and
wherein the excess and deficient electric energy calculator calculates the excess electric energy and the deficient electric energy further based on the target power of peak reduction.

18. The power controller apparatus as claimed in claim 16,
wherein the excess and deficient electric energy calculator changes at least one of the first and second thresholds depending on availability of the commercial power.

19. A power system including:
a plurality of customer facilities connected with each other via a power network; and
a power controller apparatus,
wherein each of the customer facilities comprises a load apparatus, at least one of the customer facilities further comprises a power generator apparatus, and at least two of the customer facilities further comprise battery apparatuses,
wherein the power controller apparatus comprises a predictor, an excess and deficient electric energy calculator, a group former, and a power transmitting and receiving controller,
wherein the predictor predicts demand power of the load apparatus of each of the customer facilities in a unit time interval,
wherein, for each of the customer facilities comprising the power generator apparatus, the predictor predicts generated power of the power generator apparatus of each of the customer facilities in the unit time interval,
wherein, for each of the customer facilities comprising the battery apparatus, the predictor predicts inherent stored energy indicating stored energy of the battery apparatus of each of the customer facilities in the unit time interval, the inherent stored energy achieved when power is not transmitted to nor received from other customer facilities,
wherein, for each of the customer facilities comprising the power generator apparatus and the battery apparatus, the excess and deficient electric energy calculator calculates excess electric energy generated by the power generator apparatus and not consumed by the load apparatus when the inherent stored energy reaches a first threshold, in the unit time interval, based on the demand power, the generated power, and the inherent stored energy,
wherein, for each of the customer facilities comprising the battery apparatus, the excess and deficient electric energy calculator calculates deficient electric energy having to be supplied from other customer facilities when the inherent stored energy reaches a second threshold smaller than the first threshold, in the unit time interval, based on the demand power and the inherent stored energy, or based on the demand power, the generated power, and the inherent stored energy,
wherein the group former combines at least one first customer facility and at least one second customer facility among the customer facilities comprising the battery apparatuses, the first customer facility having the excess electric energy in the unit time interval, and the second customer facility having the deficient electric energy in the unit time interval, whereby forming at least one group including the first and second customer facilities, and
wherein, for each group including the first and second customer facilities, the power transmitting and receiving controller determines transmitting power from the first customer facility to the second customer facility, so that stored energy of each of the battery apparatuses of the first and second customer facilities is equal to or less than the first threshold, and equal to or more than the second threshold, over the unit time interval.

20. The power system as claimed in claim 19,
wherein each of the customer facilities comprises a customer controller apparatus that, when instructed by the power controller apparatus to transmit power to other customer facilities, determines whether or not predetermined conditions for transmitting power to the other customer facilities are satisfied, and transmits power to the other customer facilities only when the conditions are satisfied.

21. A power controller apparatus for a power system including a plurality of customer facilities connected with each other via a power network,
wherein the power system includes a plurality of power grid facilities each including at least two of the plurality of customer facilities,
wherein each of the power grid facilities comprises a load apparatus, at least one of the power grid facilities further comprises a power generator apparatus, and at least two of the power grid facilities further comprise battery apparatuses,
wherein the power controller apparatus comprises a predictor, an excess and deficient electric energy calculator, a group former, and a power transmitting and receiving controller,
wherein the predictor predicts demand power of the load apparatus of each of the power grid facilities in a unit time interval,
wherein, for each of the power grid facilities comprising the power generator apparatus, the predictor predicts generated power of the power generator apparatus of each of the power grid facilities in the unit time interval,
wherein, for each of the power grid facilities comprising the battery apparatus, the predictor predicts inherent stored energy indicating stored energy of the battery apparatus of each of the power grid facilities in the unit time interval, the inherent stored energy achieved when power is not transmitted to nor received from other power grid facilities,
wherein, for each of the power grid facilities comprising the power generator apparatus and the battery apparatus, the excess and deficient electric energy calculator calculates excess electric energy generated by the power generator apparatus and not consumed by the load apparatus when the inherent stored energy reaches a first threshold, in the unit time interval, based on the demand power, the generated power, and the inherent stored energy,
wherein, for each of the power grid facilities comprising the battery apparatus, the excess and deficient electric energy calculator calculates deficient electric energy having to be supplied from other power grid facilities when the inherent stored energy reaches a second threshold smaller than the first threshold, in the unit time interval, based on the demand power and the inherent stored energy, or based on the demand power, the generated power, and the inherent stored energy, wherein the group former combines at least one first power grid facility and at least one second power grid facility among the power grid facilities comprising the battery apparatuses, the first power grid facility having the excess electric energy in the unit time interval, and the second power grid facility having the deficient electric energy in the unit time interval, whereby forming at least one group including the first and second power grid facilities, and wherein, for each group including the first and second power grid facilities, the power transmitting and receiving controller determines transmitting power from the first power grid facility to the second power grid facility, so that stored energy of each of the battery apparatuses of the first and second power grid facilities is equal to or less than the first threshold, and equal to or more than the second threshold, over the unit time interval.

* * * * *